(12) United States Patent
Mitadera

(10) Patent No.: US 9,688,844 B2
(45) Date of Patent: Jun. 27, 2017

(54) POLYAMIDE RESIN-TYPE COMPOSITE MATERIAL AND METHOD FOR PRODUCING SAME

(71) Applicant: Mitsubishi Gas Chemical Company, Inc., Chiyoda-ku (JP)

(72) Inventor: Jun Mitadera, Hiratsuka (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 0 days.

(21) Appl. No.: 14/528,063

(22) Filed: Oct. 30, 2014

(65) Prior Publication Data

US 2015/0048539 A1  Feb. 19, 2015

Related U.S. Application Data

(63) Continuation of application No. 13/518,651, filed as application No. PCT/JP2011/060374 on Apr. 28, 2011, now abandoned.

(30) Foreign Application Priority Data

Apr. 12, 2011 (JP) ................................. 2011-087830

(51) Int. Cl.
| | | |
|---|---|---|
| C08K 7/06 | (2006.01) |
| C08J 5/00 | (2006.01) |
| B29C 43/00 | (2006.01) |
| C08J 5/04 | (2006.01) |
| C08K 7/02 | (2006.01) |
| C08L 77/06 | (2006.01) |
| B29C 43/18 | (2006.01) |
| B29C 43/20 | (2006.01) |
| B29C 43/52 | (2006.01) |
| B29C 47/00 | (2006.01) |
| C08J 5/18 | (2006.01) |
| C08J 5/24 | (2006.01) |
| C08L 77/00 | (2006.01) |
| B29K 77/00 | (2006.01) |
| B29K 105/14 | (2006.01) |
| B29K 307/04 | (2006.01) |

(52) U.S. Cl.
CPC .............. *C08K 7/06* (2013.01); *B29C 43/003* (2013.01); *B29C 43/18* (2013.01); *B29C 43/203* (2013.01); *B29C 43/52* (2013.01); *B29C 47/0004* (2013.01); *C08J 5/04* (2013.01); *C08J 5/042* (2013.01); *C08J 5/18* (2013.01); *C08J 5/24* (2013.01); *C08K 7/02* (2013.01); *C08L 77/06* (2013.01); *B29K 2077/10* (2013.01); *B29K 2105/14* (2013.01); *B29K 2307/04* (2013.01); *B29K 2995/0016* (2013.01); *B29K 2995/0046* (2013.01); *C08J 2377/00* (2013.01); *C08J 2377/06* (2013.01); *C08L 77/00* (2013.01); *Y10T 156/10* (2015.01)

(58) Field of Classification Search
None
See application file for complete search history.

(56) References Cited

U.S. PATENT DOCUMENTS

| | | | |
|---|---|---|---|
| 3,962,524 A | 6/1976 | Miyamoto et al. |
| 4,927,583 A | 5/1990 | Lottiau et al. |
| 6,750,318 B2 | 6/2004 | Tanaka et al. |
| 8,603,600 B2 | 12/2013 | Mitadera et al. |
| 2004/0054123 A1 | 3/2004 | Tachibana et al. |
| 2004/0068037 A1 | 4/2004 | Mitadera et al. |
| 2008/0033143 A1 | 2/2008 | Tachibana et al. |
| 2010/0069539 A1* | 3/2010 | Morimoto ............... C07F 9/067 524/100 |
| 2011/0021719 A1 | 1/2011 | Yuki et al. |
| 2012/0108125 A1 | 5/2012 | Elia et al. |
| 2013/0066041 A1 | 3/2013 | Mitadera et al. |
| 2013/0123439 A1 | 5/2013 | Mitadera et al. |
| 2013/0172460 A1 | 7/2013 | Mitadera et al. |
| 2013/0230693 A1 | 9/2013 | Mitadera |

FOREIGN PATENT DOCUMENTS

| | | |
|---|---|---|
| CA | 2 764 882 | 12/2010 |
| EP | 0 094 773 A2 | 11/1983 |
| EP | 2 100 919 A1 | 9/2009 |
| JP | 63 82731 | 4/1988 |
| JP | 09-202854 | 8/1997 |
| JP | 2002 322272 | 11/2002 |
| JP | 2007 269914 | 10/2007 |
| KR | 1996-0010838 | 8/1996 |

OTHER PUBLICATIONS

International Search Report Issued Aug. 2, 2011 in PCT/JP11/60374 Filed Apr. 28, 2011.
Office Action issued Jan. 14, 2013, in Korean Patent Application No. 10-2012-7016862.
International Preliminary Report on Patentability and Written Opinion issued Oct. 24, 2013, in International application No. PCT/JP2011/060374.
Australian Office Action issued Dec. 18, 2013, in Australia Patent Application No. 2011353510.
Extended European Search Report issued Aug. 22, 2014 in Patent Application No. 11849893.0.
Office Action Issued Nov. 13, 2012 in Canadian Patent Application No. 2,781,741.

* cited by examiner

*Primary Examiner* — Ana Woodward
(74) *Attorney, Agent, or Firm* — Oblon, McClelland, Maier & Neustadt, L.L.P.

(57) ABSTRACT

A xylylenediamine-based polyamide resin/fiber composite material and molding are provided that do not exhibit a decline in properties under high temperatures and high humidities, and that exhibit a high elastic modulus and present little warping, and exhibit better recycle characteristics, a better moldability, and a better productivity than for thermosetting resins. The polyamide resin-type composite material comprises a fibrous material (B) impregnated with a polyamide resin (A) wherein at least 50 mole % of diamine structural units derived from xylylenediamine, and having a number-average molecular weight (Mn) of 6,000 to 30,000, and containing a component of a molecular weight of not more than 1,000 at 0.5 to 5 mass %.

27 Claims, No Drawings

POLYAMIDE RESIN-TYPE COMPOSITE MATERIAL AND METHOD FOR PRODUCING SAME

CROSS-REFERENCE TO RELATED APPLICATIONS

This is a continuation of and claims the benefits of priority to U.S. Ser. No. 13/518,651, filed Jun. 22, 2012. The entire contents of U.S. Ser. No. 13/518,651 are incorporated herein by reference. U.S. Ser. No. 13/518,651 is a national stage of International Application PCT/JP2011/060374, filed on Apr. 28, 2011, which claims priority to Japanese Application 2011-087830 which was filed on Apr. 12, 2011.

TECHNICAL FIELD

The present invention relates to a polyamide resin-type composite material and to a method of producing this polyamide resin-type composite material, and more particularly relates to a polyamide resin/fiber composite material that exhibits a high elastic modulus, little property deterioration at high temperatures and high humidities, an excellent resistance to warping, excellent recycling characteristics, and an excellent moldability, as well as a method of producing the same.

BACKGROUND ART

Fiber-reinforced resin-type composite materials that combine a fibrous material with a matrix resin are light and exhibit a high stiffness, and as a consequence moldings that use these fiber-reinforced resin-type composite materials are widely used as, for example, machine components, components in electrical•electronic devices, vehicle components and members, and device components for aerospace applications. For example, glass fibers, carbon fibers, ceramic fibers, and aramid fibers are used for the fibrous material.

On the other hand, thermosetting resins, e.g., unsaturated polyester resins, epoxy resins, and so forth, are typically used for the matrix resin based on considerations such as mechanical strength, moldability, and compatibility with fibrous materials. However, a crucial drawback to fiber-reinforced resin-type composite materials that use a thermosetting resin is that they cannot be re-melted and remolded.

So-called stamping molding materials are also known as composite materials that employ a thermoplastic resin as the matrix resin. Stampable sheet having reinforcing fiber and thermoplastic resin as its main components is used as a substitute for fabricated metal articles because it can be molded into complex shapes, has a high strength, and is light.

The use of polyethyleneterephthalate and polyamide 6 has also been disclosed for thermoplastic resin-based fiber-reinforced plastics (refer to Patent References 1 and 2), while moldings that use a polyamide resin and an epoxy resin have been disclosed as fiber-reinforced plastics that use both a thermoplastic resin and a thermosetting resin (refer, for example, to Patent Reference 3). These composite materials, however, have exhibited a deficient impact resistance, warping resistance, recycling performance, and productivity.

Molding methods that bring about an improved productivity with thermoplastic resin-based fiber-reinforced plastics have also been disclosed (refer to Patent References 4 and 5), but the strength and dimensional stability of the moldings provided by these methods have not been satisfactory.

Moreover, there is demand for additional improvements in the properties of fiber-reinforced plastics; for example, there is demand for improvements in the impact resistance, elastic modulus, resistance to warpage, dimensional stability, heat resistance, weight reduction, recycling characteristics, moldability, and productivity.

Unlike, for example, polyamide 6 and polyamide 66, xylylenediamine-based polyamide resins, which employ xylylenediamine as a diamine component, have an aromatic ring in the main chain and as a consequence exhibit a high mechanical strength, a high elastic modulus, a low moisture absorption rate, and an excellent oil resistance and when molded exhibit a low mold shrinkage rate, few shrinkage cavities, and little warping. Thus, the use of a xylylenediamine-based polyamide resin for the matrix resin can be expected to provide a novel composite material that has excellent properties.

However, xylylenediamine-based polyamide resins have a slow crystallization rate, poor stretching characteristics, and a poor moldability, and as a result it has been difficult to produce composite materials that employ a xylylenediamine-based polyamide resin and there has continued to be demand for the production of a novel, xylylenediamine-based polyamide resin/fibrous material composite material that exhibits excellent physical characteristics.

CITATION LIST PATENT LITERATURE

Patent Reference 1: Japanese Patent Application Publication No. S64-81826
Patent Reference 2: Japanese Patent Application Publication No. S57-120409
Patent Reference 3: Japanese Patent Application Publication No. 2009-13255
Patent Reference 4: Japanese Patent Publication No. 3,947,560
Patent Reference 5: Japanese Patent Application Publication No. 2009-113369

SUMMARY OF INVENTION

Technical Problem

An object of the present invention is to solve the problems described above by providing a facile method of producing a xylylene-based polyamide resin composite material that exhibits an excellent elastic modulus, little deterioration in properties at high temperatures and high humidities, and low warpage and that also exhibits better recycle characteristics, a better moldability, and a better productivity than thermosetting resins, and by providing moldings that use the obtained composite material.

Solution to Problem

As a result of intensive and extensive investigations in order to achieve the aforementioned object, the present inventor discovered that an excellent polyamide resin-type composite material that solves the previously described problems can be produced by impregnating a fibrous material (B) with a xylylenediamine-based polyamide resin (A) and that has a specific number-average molecular weight (Mn) and contains a specific amount of a component with a molecular weight of not more than 1,000. The present invention was achieved based on this discovery.

Thus, the first invention of the present invention provides a polyamide resin-type composite material comprising a fibrous material (B) impregnated with a polyamide resin (A) wherein at least 50 mole % of diamine structural units derived from xylylenediamine, and having a number-average molecular weight (Mn) of 6,000 to 30,000, and containing a component with a molecular weight of not more than 1,000 at 0.5 to 5 weight %.

The second invention of the present invention provides a polyamide resin-type composite material according to the first invention, wherein a cyclic compound content in the polyamide resin (A) is 0.01 to 1 mass %.

The third invention of the present invention provides a polyamide resin-type composite material according to the first or second invention, wherein the molecular weight distribution (Mw/Mn) of the polyamide resin (A) is 1.8 to 3.1.

The fourth invention of the present invention provides a polyamide resin-type composite material according to the first invention, wherein a melt viscosity of the polyamide resin (A) is 50 to 1,200 Pa·s, when measured at the temperature of a melting point of the polyamide resin (A)+30° C., at a shear rate of 122 sec$^{-1}$, and at a moisture content in the polyamide resin (A) of not more than 0.06 mass %.

The fifth invention of the present invention provides a polyamide resin-type composite material according to the first invention, wherein a flexural modulus retention rate by the polyamide resin (A) upon moisture absorption is at least 85%.

The sixth invention of the present invention provides a polyamide resin-type composite material according to the first invention, wherein the polyamide resin (A) has at least two melting points.

The seventh invention of the present invention provides a polyamide resin-type composite material according to the first invention, wherein the xylylenediamine is meta-xylylenediamine, para-xylylenediamine, or a mixture thereof.

The eighth invention of the present invention provides a polyamide resin-type composite material according to the first invention, wherein an average fiber length of the fibrous material (B) in the polyamide resin-type composite material is at least 1 cm.

The ninth invention of the present invention provides a polyamide resin-type composite material according to the first or eighth invention, wherein the fibrous material (B) has a functional group reactive with polyamide resin at a surface thereof.

The tenth invention of the present invention provides a polyamide resin-type composite material according to the ninth invention, wherein the functional group that is reactive with polyamide resin is a functional group derived from a silane coupling agent.

The eleventh invention of the present invention provides a polyamide resin-type composite material according to the first invention, wherein the fibrous material (B) is selected from glass fibers, carbon fibers, inorganic fibers, plant fibers, and organic fibers.

The twelfth invention of the present invention provides a polyamide resin-type composite material according to the first invention, wherein the polyamide resin (A)/fibrous material (B) area ratio in a cross section thereof is from 20/80 to 80/20.

The thirteenth invention of the present invention provides a polyamide resin-type composite material according to the first or twelfth invention, wherein a void area ratio in the cross section is not more than 5%.

The fourteenth invention of the present invention provides a polyamide resin-type composite material according to the first invention, wherein the polyamide resin (A) further contains short fibers (D) of the fibrous material (B).

The fifteenth invention of the present invention provides a polyamide resin-type composite material according to the fourteenth invention, wherein an average fiber diameter of the short fibers (D) is smaller than an average fiber diameter of the fibrous material (B).

The sixteenth invention of the present invention provides a method of producing a polyamide resin-type composite material, comprising:
  a step of converting a polyamide resin (A) wherein at least 50 mole % of diamine structural units derived from xylylenediamine, and having a number-average molecular weight (Mn) of 6,000 to 30,000, and containing a component with a molecular weight of not more than 1,000, at 0.5 to 5 mass %, into a film or fiber;
  a step of stacking a fibrous material (B) and the polyamide resin (A) that has been converted into a film or fiber; and
  a step of then applying heat and pressure thereto in order to impregnate the polyamide resin (A) into the fibrous material (B).

The seventeenth invention of the present invention provides a production method according to the sixteenth invention, wherein the step of impregnating the polyamide resin (A) into the fibrous material (B) is carried out in a heated atmosphere by successively applying pressure by means of a plurality of rolls.

The eighteenth invention of the present invention provides a production method according to the sixteenth invention, wherein heat capacity of crystallization for the polyamide resin (A) that has been converted into a film or fiber is at least 5 J/g and the heat capacity of crystallization for the polyamide resin (A) in the obtained polyamide resin-type composite material is at least 5 J/g.

The nineteenth invention of the present invention provides a production method according to the sixteenth invention, wherein the film surface roughness (Ra) of the polyamide resin (A) that has been converted into a film is from 0.01 to 1 µm.

The twentieth invention of the present invention provides a production method according to the sixteenth invention, wherein the polyamide resin (A) that has been converted into a fiber is multifilament and a monofilament fineness thereof is from 1 to 30 dtex.

The twenty-first invention of the present invention provides a production method according to the sixteenth or twentieth invention, wherein the polyamide resin (A) that has been converted into a fiber is a multifilament and tensile strength thereof is from 1 to 10 gf/d.

The twenty-second invention of the present invention provides a production method according to the sixteenth invention, wherein the film of the polyamide resin (A) that has been converted into a film is a film produced from a coextruded film of the polyamide resin (A) and a polyolefin resin (C) by peeling the polyolefin resin (C) layer from this coextruded film.

The twenty-third invention of the present invention provides a production method according to the sixteenth invention, wherein the moisture content of the polyamide resin (A) that has been converted into a film or fiber is from 0.01 to 0.15 mass %.

The twenty-fourth invention of the present invention provides a method of producing a molding, wherein the polyamide resin-type composite material obtained according to the sixteenth invention is heated and then molded at a temperature of 70 to 150° C. in a die or with a roll.

The twenty-fifth invention of the present invention provides a method of producing a molding, comprising:
a step of forming a polyamide resin layer at the surface of a molding obtained according to the twenty-fourth invention.

Advantageous Effects of Invention

According to the present invention, due to the impregnation of the xylylenediamine-based polyamide resin (A) containing from 0.5 to 5 mass % of a component with a molecular weight of not more than 1,000, into the fibrous material (B), the polyamide resin exhibits an excellent impregnation behavior and the resulting composite material has a high elastic modulus, undergoes little property deterioration at high temperatures and high humidities, and exhibits low warpage. In addition, since,—unlike conventional composite materials that contain a fibrous material and use a thermosetting resin—, the polyamide resin-type composite material of the present invention is a thermoplastic material, various desired moldings can be easily obtained using this material and it is a composite material that exhibits an excellent moldability, shapeability, and productivity and also excellent recycle characteristics.

Moldings provided by molding the composite material of the present invention exhibit an excellent heat resistance, an excellent strength and resistance to warping, as well as various excellent mechanical properties even when thin, and as a consequence make possible product weight reduction and can be utilized for parts, casings, and housings for electrical•electronic products, for various automotive components and members, for various structural members, and so forth.

DESCRIPTION OF EMBODIMENTS

1. Summary of the Invention

The polyamide resin-type composite material of the present invention characteristically comprises a fibrous material (B) impregnated with a polyamide resin (A) in which at least 50 mole % of the diamine structural units derived from xylylenediamine, that has a number-average molecular weight (Mn) of 6,000 to 30,000, and that contains a component with a molecular weight of not more than 1,000 at 0.5 to 5 mass %.

The method of the present invention for producing a polyamide resin-type composite material characteristically comprises a step of converting a polyamide resin of at least 50 mole % of the diamine structural units derived from xylylenediamine, having a number-average molecular weight (Mn) of 6,000 to 30,000, and containing a component of a molecular weight of not more than 1,000 at 0.5 to 5 mass %, into a film or fiber; a step of stacking a fibrous material (B) and the polyamide resin (A) that has been converted into a film or fiber; and a step of then applying heat and pressure thereto in order to impregnate the polyamide resin (A) into the fibrous material (B).

The content of the present invention is described in detail in the following.

2. The Polyamide Resin (A)

The polyamide resin (A) used in the present invention is a polyamide resin in which at least 50 mole % of the diamine structural units (structural units derived from a diamine) derives from xylylenediamine. The xylylenediamine-based polyamide resin is provided by polycondensation with a dicarboxylic acid, wherein at least 50 mole % of the diamine derived from xylylenediamine.

The polyamide resin (A) is preferably a xylylenediamine-based polyamide resin in which at least 70 mole % and more preferably at least 80 mole % of the diamine structural units derived from meta-xylylenediamine and/or para-xylylenediamine and in which preferably at least 50 mole %, more preferably at least 70 mole %, and particularly at least 80 mole % of the dicarboxylic acid structural units (structural units derived from a dicarboxylic acid) derived from an α,ω-straight chain aliphatic dicarboxylic acid having preferably from 4 to 20 carbon atoms.

While the meta-xylylenediamine and para-xylylenediamine can be used mixed in any proportion, 0 to 50 mole % meta-xylylenediamine and 50 to 100 mole % para-xylylenediamine is preferred when there is an emphasis on the heat resistance, while 50 to 100 mole % meta-xylylenediamine and 0 to 50 mole % para-xylylenediamine is preferred when the film moldability from the polyamide resin (A) is particularly important.

Diamines other than meta-xylylenediamine and para-xylylenediamine that can be used as a starting diamine component of the xylylenediamine-based polyamide resin can be exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethylhexamethylenediamine, and so forth; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, and so forth; and diamines that have an aromatic ring, e.g., bis(4-aminophenyl)ether, paraphenylenediamine, bis(aminomethyl)naphthalene, and so forth. A single such diamine can be used or a mixture of two or more can be used.

When a diamine other than xylylenediamine is used for the diamine component, it is not more than 50 mole % of the diamine structural units and preferably is not more than 30 mole % and more preferably is used in a proportion of 1 to 25 mole % and particularly preferably 5 to 20 mole %.

The $C_{4-20}$ α,ω-straight chain aliphatic dicarboxylic acids preferred for use as the starting dicarboxylic acid component for the polyamide resin (A) can be exemplified by aliphatic dicarboxylic acids such as succinic acid, glutaric acid, pimelic acid, suberic acid, azelaic acid, adipic acid, sebacic acid, undecanedioic acid, dodecanedioic acid, and so forth. While a single selection or a mixture of two or more selections can be used, adipic acid or sebacic acid is preferred among the preceding and sebacic acid is particularly preferred, because this brings the melting point of the polyamide resin into a range suitable for molding operations.

The dicarboxylic acid component other than the aforementioned $C_{4-20}$ α,ω-straight chain aliphatic dicarboxylic acid can be exemplified by phthalic acid compounds such as isophthalic acid, terephthalic acid, and ortho-phthalic acid and by naphthalenedicarboxylic acids such as isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. A single such dicarboxylic acid can be used or a mixture of two or more can be used.

In those instances in which a dicarboxylic acid other than a $C_{4-20}$ α,ω-straight chain aliphatic dicarboxylic acid is used as a dicarboxylic acid component, the use of isophthalic acid is preferred based on considerations of the moldability and barrier properties. The isophthalic acid proportion is preferably not more than 30 mole % of the dicarboxylic acid structural units, while the range of 1 to 30 mole % is more preferred and the range of 5 to 20 mole % is particularly preferred.

With reference to constituent components for the polyamide resin (A) other than the diamine component and the dicarboxylic acid component, a lactam, e.g., ε-caprolactam, laurolactam, and so forth, and/or an aliphatic aminocarboxylic acid, e.g., aminocaproic acid, aminoundecanoic acid, and so forth, can also be used as a copolymerization component within a range that does not impair the effects of the present invention.

The most preferred polyamide resins (A) are polymetaxylylene sebacamide resins, polypara-xylylene sebacamide resins, and polymeta-xylylene/para-xylylene mixed sebacamide resins provided by the polycondensation of sebacic acid with a mixed xylylenediamine of meta-xylylenediamine and para-xylylenediamine. These polyamide resins tend to provide a particularly good molding processability.

A polyamide resin having a number-average molecular weight (Mn) of 6,000 to 30,000 and containing a component with a molecular weight of not more than 1,000 at 0.5 to 5 mass % is used as the polyamide resin (A) in the present invention.

When the number-average molecular weight (Mn) is outside the range from 6,000 to 30,000, the polyamide resin (A) exhibits a diminished ability to impregnate into the fibrous material and the strength of the obtained composite material or molding therefrom then also deteriorates. The number-average molecular weight (Mn) is preferably from 8,000 to 28,000, more preferably from 9,000 to 26,000, even more preferably from 10,000 to 24,000, particularly preferably from 11,000 to 22,000, and most preferably from 12,000 to 20,000. The heat resistance, elastic modulus, dimensional stability, and molding processability are excellent in the indicated ranges.

The number-average molecular weight (Mn) referenced herein is calculated using the following formula from the terminal amino group concentration [NH$_2$] (μequivalent/g) and the terminal carboxyl group concentration [COOH] (μequivalent/g) in the polyamide resin.

$$\text{number-average molecular weight}(Mn)=2,000,000/([COOH]+[NH_2])$$

The polyamide resin (A) must contain a component with a molecular weight of not more than 1,000 at 0.5 to 5 mass %. This content of the indicated low-molecular-weight component in the indicated range results in the polyamide resin (A) having an excellent ability to impregnate into the fibrous material with the result that the obtained composite material and moldings therefrom have an excellent strength and resistance to warping. When 5 mass % is exceeded, this low-molecular-weight component bleeds out and the strength and surface appearance are then degraded.

The content of the component with a molecular weight of not more than 1,000 is preferably 0.6 to 4.5 mass %, more preferably 0.7 to 4 mass %, even more preferably 0.8 to 3.5 mass %, particularly preferably 0.9 to 3 mass %, and most preferably 1 to 2.5 mass %.

The content of the low-molecular-weight component having a molecular weight of not more than 1,000 can be adjusted by adjusting the melt polymerization conditions, e.g., the temperature and pressure during polymerization of the polyamide resin (A), the diamine dripping rate, and so forth. In particular, adjustment to any proportion can be carried out in the final phase of melt polymerization by reducing the pressure in the reactor and removing the low-molecular-weight component. The low-molecular-weight component may also be removed by subjecting the polyamide resin produced by melt polymerization to a hot water extraction, and/or by additionally carrying out a solid-phase polymerization under reduced pressure after the melt polymerization. During this solid-phase polymerization, the low-molecular-weight component can be controlled to any content by adjusting the temperature and depth of the vacuum. Adjustment is also possible by the downstream addition to the polyamide resin of low-molecular-weight component having a molecular weight of not more than 1,000.

The quantity of the component with a molecular weight of not more than 1,000 can be determined from the value as standard polymethylmethacrylate (PMMA) by measurement by gel permeation chromatography (GPC) using an "HLC-8320GPC" from the Tosoh Corporation. The measurement can be carried out using two "TSKgel SuperHM-H" columns for the measurement column, hexafluoroisopropanol (HFIP) having a sodium trifluoroacetate concentration of 10 mmol/L for the solvent, a resin concentration of 0.02 mass %, a column temperature of 40° C., a flow rate of 0.3 mL/minute, and a refractive index detector (RI). The calibration curve is constructed by measurement of 6 levels of PMMA dissolved in HFIP.

The polyamide resin (A) preferably contains a cyclic compounds of 0.01 to 1 mass %. In the present invention, this cyclic compound refers to a cyclic compound produced when a salt from the diamine component and dicarboxylic acid component as starting materials for the polyamide resin (A) forms a ring. The cyclic compounds can be quantitated by the following method.

Pellets of the polyamide resin (A) are ground using an ultra-centrifugal grinder; the result is loaded on a 0.25 mmΦ sieve; and 10 g of a powder sample less than or equal to 0.25 mmΦ is measured onto an extraction thimble. This is followed by Soxhlet extraction for 9 hours with 120 mL methanol and concentration of the resulting extract to 10 mL with an evaporator taking care to avoid evaporation to dryness. If oligomer precipitates at this point, it is removed by passing the liquid through a suitable PTFE filter. The obtained extract is diluted 50× with methanol to yield a solution that is submitted to the measurement. The cyclic compound content is determined by performing quantitative analysis using a high-performance liquid chromatograph HPLC from Hitachi High-Technologies Corporation.

By having the cyclic compound content be in the indicated range, the polyamide resin (A) will exhibit an excellent impregnation performance into the fibrous material, which supports obtaining an excellent strength for the obtained composite material and moldings therefrom as well as minimizing warpage and facilitating further improvement in the dimensional stability.

The cyclic compound content is more preferably 0.05 to 0.8 mass % and even more preferably is 0.1 to 0.5 mass %.

The polyamide resin (A) produced by melt polymerization will frequently contain significant amounts of cyclic compounds, and these are generally removed by carrying out, for example, a hot water extraction. The amount of cyclic compound can be adjusted by adjusting the severity of this hot water extraction. The amount of cyclic compound can also be adjusted by adjusting the pressure during melt polymerization.

The molecular weight distribution (weight-average molecular weight/number-average molecular weight (Mw/Mn)) of the polyamide resin (A) of the present invention is preferably 1.8 to 3.1. This molecular weight distribution is more preferably 1.9 to 3.0 and even more preferably is 2.0 to 2.9. Bringing the molecular weight distribution into this range results in an excellent impregnation behavior by the polyamide resin (A) into the fibrous material and thus tends to facilitate obtaining a composite material that has excellent mechanical properties.

The molecular weight distribution of the polyamide resin (A) can be adjusted, for example, by the judicious selection of the polymerization reaction conditions, e.g., the type and quantity of initiator and catalyst used in the polymerization and the reaction temperature, pressure, and time. It can also be adjusted by fractional precipitation of the polyamide resin after polymerization and/or by mixing a plurality of polyamide resins obtained under different polymerization conditions and having different average molecular weights.

The molecular weight distribution can be determined by GPC measurement and specifically can be determined as the value as standard polymethylmethacrylate using an "HLC-8320GPC" from the Tosoh Corporation as the instrument and using two columns of "TSKgel SuperHM-H" (by Tosoh Corporation) for the column, hexafluoroisopropanol (HFIP) having a sodium trifluoroacetate concentration of 10 mmol/L for the eluent, a resin concentration of 0.02 mass %, a column temperature of 40° C., a flow rate of 0.3 mL/minute, and a refractive index detector (RI). The calibration curve is constructed by measurement of 6 levels of PMMA dissolved in HFIP.

The melt viscosity of the polyamide resin (A), when measured at the temperature of the melting point of the polyamide resin (A)+30° C., at a shear rate of 122 sec$^{-1}$, and at a moisture content in the polyamide resin (A) of not more than 0.06 mass %, is preferably 50 to 1,200 Pa·s. Bringing the melt viscosity into the indicated range provides an excellent impregnation behavior by the polyamide resin (A) into the fibrous material. It also facilitates processing of the polyamide resin (A) into a film or fiber. When, as discussed below, the polyamide resin (A) has two or more melting points, the melting point for the measurement is taken to be the peak top temperature of the endothermic peak at the higher or highest temperature.

The melt viscosity is more preferably in the range from 60 to 500 Pa·s and is even more preferably in the range from 70 to 100 Pa·s.

The melt viscosity of the polyamide resin can be adjusted by, for example, judicious selection of the charge ratio between the starting dicarboxylic acid component and diamine component, the polymerization catalyst, the molecular weight modifier, the polymerization temperature, and the polymerization time.

The polyamide resin (A) preferably has a flexural modulus retention rate upon moisture absorption of at least 85%. Bringing the flexural modulus retention rate upon moisture absorption into the indicated range tends to cause the resulting composite material and moldings therefrom to exhibit little decline in properties at high temperatures/high humidities and to cause shape changes such as warping to be small.

This flexural modulus retention rate upon moisture absorption is defined as the ratio (%), for a flexural test specimen of the polyamide resin (A), of the flexural modulus when a 0.5 mass % moisture absorption has occurred, to the flexural modulus when a 0.1 mass % moisture absorption has occurred. A higher value for this retention rate means that the flexural modulus is more resistant to being reduced by the absorption of moisture.

The flexural modulus retention rate upon moisture absorption is more preferably at least 90% and is even more preferably at least 95%.

The flexural modulus retention rate upon moisture absorption of the polyamide resin can be controlled using the mixing proportions for the para-xylylenediamine and meta-xylylenediamine, wherein a higher proportion of para-xylylenediamine can provide a better flexural modulus retention rate. The flexural modulus retention rate upon moisture absorption can also be adjusted by controlling the crystallinity of a flexural test specimen.

The moisture absorption rate of the polyamide resin (A)—defined as the moisture absorption when the resin is immersed in water for 1 week at 23° C., removed, the moisture is wiped off, and measurement is performed immediately—is preferably not more than 1 mass % and more preferably is not more than 0.6 mass % and even more preferably is not more than 0.4 mass %. When the indicated range is satisfied, moisture absorption-induced deformation of the resulting composite material and moldings therefrom is easily stopped; moreover, foaming is inhibited during molding of the composite material, e.g., when heat and pressure are applied, and a molding can be obtained that presents few bubbles.

In addition, a polyamide resin (A) suitable for use has a terminal amino group concentration ([NH$_2$]) of preferably less than 100 μequivalent/g, more preferably 5 to 75 μequivalent/g, and even more preferably 10 to 60 μequivalent/g, and a terminal carboxyl group concentration ([COOH]) of preferably less than 150 μequivalent/g, more preferably 10 to 120 μequivalent/g, and even more preferably 10 to 100 μequivalent/g. The use of a polyamide resin with the indicated terminal group concentrations facilitates a stable viscosity during processing of the polyamide resin (A) into fiber or film form and also tends to provide an excellent reactivity with carbodiimide compounds, vide infra.

The ratio of the terminal amino group concentration to the terminal carboxyl group concentration ([NH$_2$]/[COOH]) is preferably not more than 0.7 and more preferably is not more than 0.6 and particularly preferably is not more than 0.5. A ratio larger than 0.7 can result in difficulty in controlling the molecular weight during polymerization of the polyamide resin (A).

The terminal amino group concentration can be measured by dissolving 0.5 g of the polyamide resin at 20 to 30° C. with stirring in 30 mL of a mixed phenol/methanol (4:1) solvent and titration with 0.01 N hydrochloric acid. The terminal carboxyl group concentration can be determined by dissolving 0.1 g of the polyamide resin in 30 mL benzyl alcohol at 200° C.; adding 0.1 mL of a Phenol Red solution in the range from 160° C. to 165° C.; and titrating the resulting solution with a titrant prepared by dissolving 0.132 g KOH in 200 mL benzyl alcohol (0.01 mol/L as the KOH concentration). The endpoint is taken to be the point at which the color has changed from yellow to red and no further color change has occurred.

The molar ratio of the reacted diamine units to the reacted dicarboxylic acid units (number of moles of reacted diamine units/number of moles of reacted dicarboxylic acid units, also referred to below as the "reaction molar ratio") in the polyamide resin (A) of the present invention is preferably from 0.97 to 1.02. The use of this range makes it easy to control the molecular weight and the molecular weight distribution of the polyamide resin (A) into a freely selected range.

The reaction molar ratio is more preferably less than 1.0, even more preferably less than 0.995, and particularly preferably less than 0.990, while its lower limit is more preferably not less than 0.975 and even more preferably not less than 0.98.

This reaction molar ratio (r) can be determined using the following formula.

$$r=(1-cN-b(C-N))/(1-cC+a(C-N))$$

in the formula:
a: M1/2
b: M2/2
c: 18.015 (the molecular weight of water (g/mol))
M1: the molecular weight of the diamine (g/mol)
M2: the molecular weight of the dicarboxylic acid (g/mol)
N: the terminal amino group concentration (equivalent/g)
C: the terminal carboxyl group concentration (equivalent/g)

When the polyamide resin is synthesized using monomers that have different molecular weights for the diamine component or for the dicarboxylic acid component, M1 and M2 are of course calculated in conformity with the blending ratio (molar ratio) for the monomers blended as the starting material. When the interior of the synthesis vessel is a completely sealed system, the charged monomer molar ratio will be the same as the reaction molar ratio; however, since an actual synthesis apparatus cannot be made into a completely sealed system, the charged molar ratio and the reaction molar ratio will not necessarily be the same. The charged molar ratio and the reaction molar ratio will not necessarily be the same since the charged monomer also does not necessarily undergo complete reaction. Accordingly, the reaction molar ratio denotes the molar ratio of the actually reacted monomer that is determined from the terminal group concentrations of the finished polyamide resin.

The reaction molar ratio of the polyamide resin (A) can be adjusted by establishing a suitable value for the charged molar ratio of the starting dicarboxylic acid component and diamine component and by setting suitable values for the reaction conditions, e.g., the reaction time, reaction temperature, xylylenediamine dripping rate, pressure within the vessel, timing of the beginning of pressure reduction, and so forth.

When the method of producing the polyamide resin is a so-called salt method, the reaction molar ratio may be brought to 0.97 to 1.02 specifically by, for example, establishing the starting diamine component/starting dicarboxylic acid component ratio in this range and bringing about a thorough reaction. For methods in which the diamine is continuously dripped into the molten dicarboxylic acid, in addition to setting the charge ratio in the indicated range, the amount of diamine that is refluxed during the diamine dripping can also be controlled and dripped-in diamine can be removed from the reaction system. In specific terms, diamine may be removed from the system by controlling the temperature in a refluxed column into an optimal range and by adjusting the packing, e.g., Raschig rings, Lessing rings, saddles, and so forth, in a packed column to a suitable amount and a suitable shape. In addition, unreacted diamine can also be removed from the system by shortening the reaction time after the diamine has been dripped in. Unreacted diamine can also be removed from the reaction system as necessary by controlling the diamine dripping rate. It is possible using these methods to control the reaction molar ratio into the prescribed range even when the charge ratio is outside the desired range.

There are no particular limitations on the method of producing the polyamide resin (A), and this production can be carried out using heretofore known methods and polymerization conditions. A small amount of a monoamine or a monocarboxylic acid may be added as a molecular weight modifier during polycondensation of the polyamide resin. For example, production can be carried out by a method in which a salt from the xylylenediamine-containing diamine component and the dicarboxylic acid, e.g., adipic acid or sebacic acid, is heated in the presence of water with an overpressure applied and polymerization is then carried out in the melt state while removing the added water and the water of condensation. Production can also be carried out by a method in which the xylylenediamine is directly added to a dicarboxylic acid melt and polycondensation is performed under normal pressure. In this case, the diamine is continuously added to the dicarboxylic acid in order to keep the reaction system in a uniform liquid state, and during this interval the polycondensation is advanced while heating the reaction system so as to prevent the reaction temperature from falling below the melting point of the oligoamide and polyamide that are produced.

The polyamide resin (A) may also be produced by carrying out a solid-phase polymerization after production by a melt polymerization method. There are no particular limitations on the method for carrying out the solid-phase polymerization, and production may be carried out using the heretofore known methods and polymerization conditions.

The melting point of the polyamide resin (A) in the present invention is preferably from 150 to 310° C. and more preferably is from 180 to 300° C.

The glass-transition temperature of the polyamide resin (A) is preferably from 50 to 100° C., more preferably from 55 to 100° C., and particularly preferably from 60 to 100° C. The heat resistance tends to be excellent in the indicated range.

The melting point refers to the temperature observed at the peak top of the endothermic peak during temperature ramp up by differential scanning calorimetry (DSC). The glass-transition temperature refers to the glass-transition temperature that is measured during re-heating after the sample has already been heated and melted once in order to eliminate the effect of the thermal history on the crystallinity. These measurements can be carried out, for example, using a "DSC-60" from the Shimadzu Corporation, a sample size of approximately 5 mg, and a nitrogen flow of 30 mL/minute for the gas atmosphere. The melting point can be determined as the temperature at the peak top of the endothermic peak observed during melting by heating from room temperature at a rate of temperature rise of 10° C./minute to at least the temperature of the anticipated melting point. The melted polyamide resin is then quenched with dry ice and the glass-transition temperature can thereafter be determined by re-heating at a rate of 10° C./minute to at least the melting point temperature.

The polyamide resin (A) is also preferably a polyamide resin that has at least two melting points. Polyamide resin that has at least two melting points is preferred because it tends to have an excellent heat resistance and an excellent molding processability when the composite material is molded.

The following is a preferred example of a polyamide resin that has at least two melting points: a polyamide resin that has at least two melting points, in which at least 70 mole % of the diamine structural units derived from xylylenediamine and at least 50 mole % of the dicarboxylic acid structural units derived from sebacic acid, in which the xylylenediamine unit contains 50 to 100 mole % unit deriving from para-xylylenediamine and 0 to 50 mole % unit deriving from meta-xylylenediamine, and which has a number-average molecular weight (Mn) of 6,000 to 30,000.

The at least two melting points under consideration here are ordinarily in the range from 250 to 330° C. and preferably from 260 to 320° C., more preferably from 270 to 310° C., and particularly preferably from 275 to 305° C. A polyamide resin having an excellent heat resistance and an excellent molding processability during molding of the composite material is provided by having at least two melting points, preferably in the indicated temperature ranges.

Such a polyamide resin (A) having at least two melting points can be obtained preferably by using the following method (1), (2), or (3), or a combination of a plurality of these methods, during melt polymerization.

(1) A method containing a step of withdrawing the polyamide resin in strand form from the polymerization reactor so as to bring the polyamide resin into the temperature range from the melting point of the polyamide resin to its melting point+20° C., and a step of cooling the withdrawn polyamide resin strand in 0 to 60° C. cooling water.

(2) A method comprising, as a process preceding a step of withdrawing the polyamide resin in strand form from the polymerization reactor, a step of melting the dicarboxylic acid; a step of continuously dripping the diamine into the dicarboxylic acid melt; a step of holding, after the completion of the diamine dripping, for 0 to 60 minutes at from the melting point of the polyamide resin to its melting point+30° C.; and a step of continuing the polycondensation reaction under negative pressure.

(3) A method comprising, as a process preceding a step of withdrawing the polyamide resin in strand form from the polymerization reactor, a step of holding a melt of the salt from the dicarboxylic acid and diamine under the application of pressure; a step of raising the temperature while lowering the pressure; and a step of holding for 0 to 60 minutes at from the melting point of the polyamide resin to its melting point+30° C.

The melting point referenced in the preceding (1) to (3) is the temperature of the peak top of the peak at the higher or highest temperature among the plurality of endothermic peaks present in the DSC measurement.

Method (1) is a method in which the polyamide resin is cooled at a prescribed temperature range while being withdrawn in strand form under prescribed temperature conditions. While the polyamide resin has a single composition, it is thought that the withdrawal and cooling of the polyamide resin under the indicated conditions results in the solidification of a plurality of crystalline structures that have different melting points. The temperature of the polyamide resin at the time of strand withdrawal is preferably from the melting point to the melting point+15° C. Strand cooling is in 0 to 60° C. cooling water and preferably 10 to 50° C. cooling water and more preferably 20 to 45° C. cooling water.

The time for which the strand is in contact with the cooling water is preferably about 2 to 60 seconds and more preferably is 5 to 50 seconds.

While the polyamide resin has a single composition, it is thought that the use of the indicated range makes possible the solidification of a plurality of crystalline structures that have different melting points. At a cooling time of not greater than 2 seconds, inadequate cooling occurs and solidification into the preferred crystalline structures may not take place; in addition, phenomena such as the strand twisting around the cutter during pelletizing may occur, resulting in an impaired productivity. A cooling time in excess of 60 seconds can produce problems such as a too high moisture absorption by the obtained polyamide resin. This cooling time can be suitably adjusted using, for example, the distance over which the strand is in contact with the water in the cooling water tank, the length of the cooling water tank, or the time for which cooling water is sprayed or atomized onto the strand.

The strand withdrawal rate is preferably 100 to 300 m/minute, more preferably 120 to 280 m/minute, even more preferably 140 to 260 m/minute, and particularly preferably 150 to 250 m/minute. It is thought that the indicated ranges enable the solidification of the crystalline structure of the polyamide resin into a plurality of crystalline structures that have different melting points. The indicated ranges are also preferred because they avoid excessive moisture absorption in the resulting pellets. They are also preferred because they result in facile pelletizing and hence an improved productivity. The strand withdrawal rate can be adjusted using the speed of the rotating teeth at the pelletizer and the pressure in the reactor at the time of withdrawal.

Method (2) is a method that is executed as a process preceding the step of withdrawing the polyamide resin in strand form from the polymerization reactor and that comprises a step of melting the dicarboxylic acid; a step of continuously dripping the diamine into the dicarboxylic acid melt; a step of holding, after the completion of the diamine dripping, for 0 to 60 minutes at from the melting point of the polyamide resin to its melting point+30° C.; and a step of continuing the polycondensation reaction under negative pressure.

In the step of melting the dicarboxylic acid, prior to the polycondensation step the solid dicarboxylic acid may be charged to the reactor and superheated and melted, or prior to the polycondensation step the preliminarily melted dicarboxylic acid may be charged to the reactor.

In the step of continuously dripping the diamine into the dicarboxylic acid melt, the temperature in the reactor is preferably continuously raised, in conformity with the increase in the amount of diamine dripped in, while controlling the interior of the reactor to from a temperature that is greater than or equal to the temperature at which the produced polyamide oligomer does not solidify to the nonsolidification temperature+30° C. The temperature in the reactor when the entire amount of the diamine has finally been dripped in is preferably from the melting point of the polyamide resin to the melting point+30° C. The interior of the reactor is preferably substituted with nitrogen during this period. In addition, the interior of the reactor is preferably brought into a uniform fluid state during this period by mixing the interior of the reactor with a stirring blade.

The interior of the reactor is preferably also pressurized during this interval. 0.1 to 1 MPa is preferred; 0.2 to 0.6 MPa is more preferred; and 0.3 to 0.5 MPa is even more preferred.

This pressurization may be performed with nitrogen or using steam. The execution of this step makes possible the production at a good productivity of a polyamide resin that has uniform properties.

By executing in method (2) the step of holding for 0 to 60 minutes at from the melting point of the polyamide resin to its melting point+30° C. and the step of continuing the polycondensation reaction under negative pressure, the polyamide resin obtained by going through these steps readily tends to be polyamide resin that has a plurality of melting points.

When the step of holding at from the melting point of the polyamide to the melting point+30° C. is longer than 60 minutes, the polyamide resin may then have a single melting point, and as a result holding for longer than 60 minutes is disfavored. The step of holding at from the melting point to the melting point+30° C. is more preferably from 1 to 40 minutes, even more preferably from 1 to 30 minutes, and particularly preferably from 1 to 20 minutes.

In the step of continuing the polycondensation reaction at a negative pressure, the pressure is preferably from 0.05 MPa to less than atmospheric pressure, more preferably from 0.06 to 0.09 MPa, and even more preferably from 0.07 to 0.085 MPa. The time here is preferably from 1 to 60 minutes. 1 to 40 minutes is more preferred, 1 to 30 minutes is even more preferred, and 1 to 20 minutes is particularly preferred. The reaction temperature is preferably from the melting point to the melting point+30° C. and more preferably from the melting point to the melting point+20° C. Continuing the polycondensation reaction under negative pressure as described above makes it possible to adjust the polyamide resin to a desired molecular weight and to establish a plurality of melting points for the polyamide resin.

Method (3) comprises a step of holding a melt of the salt from the dicarboxylic acid and diamine under the application of pressure; a step of raising the temperature while lowering the pressure; and a step of holding for 0 to 60 minutes at from the melting point of the polyamide resin to its melting point+30° C.

The step of holding a melt of the salt from the dicarboxylic acid and diamine under the application of pressure and the step of raising the temperature while reducing the pressure are a production method in accordance with the general salt method. The temperature in the step of holding a melt of the salt from the dicarboxylic acid and diamine under the application of pressure is preferably from the melting point of the polyamide oligomer to the melting point+30° C. and more preferably is from the melting point of the polyamide oligomer to the melting point+20° C., while the melt is held for preferably 60 to 300 minutes and more preferably 90 to 240 minutes while controlling the interior of the reactor at a pressure preferably of 1 to 2 MPa and more preferably of 1.5 to 1.9 MPa.

In the step of raising the temperature while reducing the pressure, the pressure reduction and temperature ramp up are performed preferably at a pressure reduction rate of 1 to 2 MPa/hour and more preferably 1.5 to 1.8 MPa/hour and at a temperature ramp-up rate preferably of 10 to 100° C./hour and more preferably 20 to 80° C./hour. The pressure in the holding step after pressure reduction and temperature ramp up is preferably from 0.05 MPa to less than atmospheric pressure, more preferably from 0.06 to 0.09 MPa, and even more preferably from 0.07 to 0.085 MPa. The time here is preferably 1 to 60 minutes. 1 to 40 minutes is more preferred, 1 to 30 minutes is even more preferred, and 1 to 20 minutes is particularly preferred. The temperature at this time is preferably from the melting point to the melting point+30° C. and is more preferably from the melting point to the melting point+20° C.

Holding is carried out for 0 to 60 minutes at from the melting point of the polyamide resin to its melting point+30° C. By going through this step, the polyamide resin provided by going through these steps can be obtained as a polyamide resin that has a plurality of melting points. When the step of holding at from the melting point of the polyamide resin to its melting point+30° C. is longer than 60 minutes, the polyamide resin may have a single melting point, and as a result holding for longer than 60 minutes is disfavored. The step of holding at the melting point to the melting point+30° C. is more preferably 1 to 40 minutes, even more preferably 1 to 30 minutes, and particularly preferably 1 to 20 minutes.

In addition to the xylylenediamine-based polyamide resin, the polyamide resin (A) may also contain an additional polyamide resin and/or an elastomer component. This additional polyamide resin can be exemplified by polyamide 66, polyamide 6, polyamide 46, polyamide 6/66, polyamide 10, polyamide 612, polyamide 11, polyamide 12, hexamethylenediamine, polyamide 66/6T composed of adipic acid and terephthalic acid, and polyamide 6I/6T composed of hexamethylenediamine, isophthalic acid, and terephthalic acid.

For example, known elastomers such as polyolefin-type elastomers, diene-type elastomers, polystyrene-type elastomers, polyamide-type elastomers, polyester-type elastomers, polyurethane-type elastomers, fluoroelastomers, and silicone-type elastomers can be used for the elastomer component, wherein the elastomer component is preferably a polyolefin-type elastomer or a polystyrene-type elastomer.

In order to impart compatibility with the polyamide resin (A), a modified elastomer—as provided by modification in the presence or absence of a radical initiator, for example, by an α,β-unsaturated carboxylic acid or anhydride thereof or acrylamide or a derivative thereof—is also preferred for the elastomer.

The content of this additional polyamide resin or elastomer component is generally not more than 30 mass % in the polyamide resin (A) and preferably is not more than 20 mass % and particularly is not more than 10 mass %.

The polyamide resin (A) can also be used blended with a single polyamide resin or with a plurality of polyamide resins.

A single selection or a plurality of selections from, for example, polyester resins, polyolefin resins, polyphenylenesulfide resins, polycarbonate resins, polyphenyleneether resins, and polystyrene resins, can also be blended within a range that does not impair the objects and effects of the present invention.

3. The Fibrous Material (B)

The fibrous material (B) used in the present invention can be exemplified by glass fibers; carbon fibers; plant fibers (including kenaf and bamboo fibers); inorganic fibers such as alumina fiber, boron fiber, ceramic fibers, and metal fibers (e.g., steel fiber); and organic fibers such as aramid fibers, polyoxymethylene fibers, aromatic polyamide fibers, polyparaphenylenebenzobisoxazole fibers, and ultrahigh molecular weight polyethylene fibers. The use of carbon fibers is particularly preferred among the preceding because carbon fibers, while being light weight, have such excellent characteristics as high strength and high elastic modulus. Polyacrylonitrile-based carbon fibers and pitch-based carbon fibers are preferably used for the carbon fiber.

These fibrous materials (B) can take a variety of configurations, e.g., a fibrous material provided by simply aligning a monofilament or multifilament in a single direction or in alternating intersection, a fabric such as a knit, a nonwoven fabric, or a mat. A monofilament, fabric, nonwoven fabric, or mat configuration is preferred among the preceding. The use is also preferred of a prepreg as provided by stacking or laying up the preceding and impregnating with, for example, a binder.

The average fiber diameter of the fibrous material (B) is preferably from 1 to 100 µm, more preferably from 3 to 50 µm, even more preferably from 4 to 20 µm, and particularly preferably from 5 to 10 µm. When the average particle diameter is in this range, processing is easy and the obtained molding has an excellent elastic modulus and strength. The average particle diameter can be measured by observation with, for example, a scanning electron microscope (SEM). The length of at least 50 randomly selected fibers is measured and the number-average average fiber diameter is then calculated.

The fineness of the fibrous material (B) is preferably 20 to 3,000 tex and more preferably is 50 to 2,000 tex. When the fineness is in this range, processing is easy and the obtained molding has an excellent elastic modulus and strength. The fineness can be determined by determining the weight of long fibers of freely selected length and converting to the weight per 1,000 m. With regard to the filament count, generally about 500 to 30,000 carbon fibers are preferably used.

The fiber length of the fibrous material (B) present in the polyamide-type composite material of the present invention, expressed as the average fiber length, is preferably at least 1 cm, more preferably at least 1.5 cm, even more preferably at least 2 cm, and particularly preferably at least 3 cm. The upper limit on the average fiber length will vary as a function of the particular application, but is preferably not more than 500 cm, more preferably not more than 300 cm, and even more preferably not more than 100 cm.

There are no particular limitations on the method of measuring the average fiber length in the composite material, but, for example, the length can be measured on the fibers remaining after the polyamide resin has been dissolved by dissolving the composite material in hexafluoroisopropanol (HFIP). Measurement can be carried out by visual observation or, depending on the circumstances, by observation with, for example, an optical microscope or a scanning electron microscope (SEM). The length of 100 randomly selected fibers is measured and the number-average average fiber length is then calculated.

There are no particular limitations on the average fiber length of the starting material prior to use of the fibrous material that is used, but, viewed from the perspective of bringing about a good molding processability, the range from 1 to 10,000 m is preferred, approximately 100 to 7,000 m is more preferred, and approximately 1,000 to 5,000 m is even more preferred.

The fibrous material (B) used in the present invention need not be used in the form of the chopped strand—as heretofore used in fiber-reinforced composite materials—provided by bundling the gathered fiber strand and cutting to a prescribed length. In a more preferred embodiment of the present invention, fiber longer than this is used for the fibrous material (B), and, unlike the case in which a resin is melt mixed with the heretofore frequently used chopped strand and pelletization is performed, the composite material is obtained using a long-fiber material as such by stacking it with the polyamide resin (A) and applying heat and pressure thereto to effect impregnation. The use of a fibrous material (B) that presents a long-fiber configuration makes it possible to improve the elastic modulus and strength of the obtained molding more than in the case of a molding material that uses conventional chopped strand or fibrous material in which what is known as long fiber has been broken. The use of a long-fiber fibrous material also makes it possible to generate anisotropy in the strength of the molding, e.g., to improve the strength in a prescribed direction of the molding. In addition, the chopped strand production step can be omitted and the cost of production can then be brought down.

However, the present invention certainly does not exclude the co-use of a short fiber (D) of the fibrous material (B). In the case of co-use of the short fiber (D), the average particle diameter of the short fiber (D) is preferably smaller than the average fiber diameter of the fibrous material (B).

In order to improve the wettability and interfacial adhesiveness with the polyamide resin (A), a functional group that is reactive with the polyamide resin is preferably present on the surface of the fibrous material.

A preferred example of the presence of a functional group that is reactive with the polyamide resin is a fibrous material that has been subjected to a surface treatment with, e.g., a surface treatment agent or sizing agent.

The surface treatment agent can be exemplified by surface treatment agents comprising a functional compound such as an epoxy compound, acrylic compound, isocyanate compound, silane compound, titanate compound, and so forth, for example, a silane coupling agent, a titanate coupling agent, and so forth, wherein silane coupling agents are preferred.

The silane coupling agent can be exemplified by triaryloxysilane compounds and trialkoxysilane compounds such as aminopropyltriethoxysilane, phenylaminopropyltrimethoxysilane, glycidylpropyltriethoxysilane, methacryloxypropyltrimethoxysilane, and vinyltriethoxysilane, and by ureido silanes, sulfide silanes, vinylsilanes, imidazole silanes, and so forth.

Preferred examples of the sizing agent are epoxy resins, e.g., bisphenol A-type epoxy resins and so forth, and vinyl ester resins that are epoxy acrylate resins that have the acrylic or methacrylic group in each molecule, e.g., bisphenol A-type vinyl ester resins, novolac-type vinyl ester resins, brominated vinyl ester resins, and so forth. The sizing agent may also be a urethane-modified resin from, for example, an epoxy resin or a vinyl ester resin.

4.1 Production of the Polyamide Resin (A) Film or Fiber

Known methods can be used to convert the polyamide resin (A) into film or fiber form. For example, the fiber can be produced from polyamide resin pellets by melt spinning, or a method can be used in which a film is continuously molded by extruding the resin from an extruder.

when the polyamide resin (A) is very stiff and as a consequence facile or stable film production is problematic.

4.2 The Polyamide Resin (A) Film

In a preferred method of producing a film of the polyamide (A) resin, a laminate film of the previously described polyamide resin (A) and a polyolefin resin (C), infra, is first produced.

There are no particular limitations on the method of producing the laminate film, and known methods can be used. In a preferred method, the polyamide resin (A) is produced preferably by blending with any of various additives, infra, and any optional additional resin, and, using this resin composition and the polyolefin resin (C) described below, a polyamide resin (A)/polyolefin resin (C) laminate film is obtained by coextrusion molding these using, for example, a T-die coextruder, an inflation coextruder, and so forth.

The laminate resin film may have a polyolefin resin (C) layer/polyamide resin (A) layer bilayer structure or a polyolefin resin (C) layer/polyamide resin (A) layer/polyolefin resin (C) layer trilayer structure.

In the case of production by T-die coextrusion, the individual melts of resins (A) and (C), provided by kneading and extrusion with an extruder, are introduced into a T-die capable of 2 resin/2 layer lamination or 2 resin/3 layer lamination and are laminated therein and then extruded from the T-die as a molten film. Various layer ratios can be established for the layer ratio between or among the individual layers, and the extruded molten film can be formed into a prescribed film thickness by cooling under the application of pressure with a cooling roll.

With regard to the thickness of the laminate film, the polyamide resin (A) layer is preferably 5 to 50 µm and more preferably is 10 to 30 µm. At greater than 50 µm, the obtained polyamide resin film is too thick, which then results in a poor impregnation behavior into the fibrous material (B) and/or a large amount of warping, making it difficult to obtain the desired composite material. The lower limit is preferably 5 µm based on productivity considerations.

The thickness of the polyolefin resin (C) layer is preferably 5 to 50 µm and is more preferably 10 to 30 µm. A polyolefin resin (C) layer thickness in the indicated range is preferred because this tends to provide an excellent moldability for the laminate resin film. It is also preferred because it provides an excellent interlayer peelability when the laminate film is peeled, because it provides an excellent windability for the polyamide resin (A) layer, and because it tends to facilitate making a film roll of the polyamide resin (A) that is free of winding wrinkles.

The polyolefin resin (C) used in the laminate is a resin provided by the polymerization of olefin monomer, as typified by polyethylene resins and polypropylene resins.

The polyethylene resin (C) can be specifically exemplified by low-density polyethylene (LDPE), high-density polyethylene (HDPE), medium-density polyethylene (MDPE), high-pressure low-density polyethylene (HPLDPE), linear low-density polyethylene (LLDPE), very low-density polyethylene (VLDPE), low-crystallinity ethylene-1-butene random copolymer, ethylene-propylene copolymer, ethylene-vinylacetate copolymer, ethylene-acrylicacid copolymer, and ethylene-acrylateester copolymer. A single one of these may be used by itself or two or more may be used in combination. The polypropylene resin can be exemplified by polypropylene homopolymers and propylene copolymers in which propylene is copolymerized with another α-olefin such as ethylene, 1-butene, or 1-hexene.

The polyolefin resin (C) is preferably a polypropylene homopolymer or copolymer, high-pressure low-density polyethylene (HPLDPE), or linear low-density polyethylene (LLDPE), while high-pressure low-density polyethylene (HPLDPE) is particularly effective in terms of the peelability and the stability of molding processability.

The polyolefin resin (C) will exhibit a satisfactory peeling performance with respect to the polyamide resin (A), but a release agent may also be incorporated as necessary. For example, a known glyceride-based release agent may be used for the release agent. When a release agent is incorporated, the quantity of incorporation is 0.1 to 10 mass parts and preferably 1 to 5 mass parts per 100 weight parts of the polyolefin resin (C).

A film of the polyamide resin (A) is produced by peeling the polyolefin resin (C) layer from the previously described polyolefin resin (C) layer/polyamide resin (A) layer bilayer film or the polyolefin resin (C) layer/polyamide resin (A) layer/polyolefin resin (C) layer trilayer laminate film. This step can provide a thin polyamide resin (A) film. Peeling of the polyolefin resin (C) layer may be carried out by any method, but in the industrial sphere peeling is performed, for example, with a peeling roll and the obtained polyamide resin (A) film is wound up.

In addition to the film molding method described above, the polyamide resin (A) can be processed into film form by extrusion as a single layer. In this case, the film is preferably molded using a method that also executes a texturing process on the film surface. This is effective in particular in those instances where rupture is prone to occur when thinning is carried out, with microstress or uneven stress being applied during molding. It is thought that by texturing the surface, i.e., by preparing a film that has a peak-and-valley textured surface that has microscopic peaks and valleys in the surface, the frictional resistance between the film surface during film molding and the take-up device, e.g., a roll, can be made small and the stress imparted to the film can be controlled to small and uniform values and film rupture can be prevented as a result. Moreover, when winding into a roll form is carried out, the friction between film surfaces can be reduced and winding can be carried out without wrinkling or creasing and the stress during winding can be relaxed and film rupture can be prevented as a result. Furthermore, the productivity is improved when post-processing is performed, e.g., slitting the film roll to some selected width, bonding with another film by dry lamination, and so forth, since friction with the equipment is prevented and rupture is thereby prevented.

The texturing may be disposed on only one side of the film or may be disposed on both sides, with disposition on both the front and back sides being preferred.

This texturing refers to texturing patterns as broadly defined wherein a microscopic peak-and-valley surface that presents height differences is present, e.g., leather texturing, satin texturing, wood grain texturing, grained texturing, wrinkle texturing, stone texturing, and so forth. Satin texturing is preferred among the preceding.

The surface roughness (Ra) of the textured polyamide resin (A) film is preferably 0.01 to 1 µm and is more preferably 0.015 to 0.8 µm, even more preferably 0.1 to 0.6 µm, and particularly 0.2 to 0.5 µm.

At less than 0.01 µm, the frictional force between the film and the film molding equipment cannot be satisfactorily reduced and film rupture may then occur during the molding operation due to the stress applied to the film. In addition, the film-to-film frictional force is also not adequately reduced, and this can result in the introduction of wrinkles or creases during winding of the film into roll form, which can impair product value. The appearance of the film may be degraded at above 1 µm.

In the case of peak-and-valley texturing of the polyamide resin (A) film surface, the distance between adjacent peaks in the texturing is preferably from 0.1 to 1 µm, more preferably from 0.2 to 0.9 µm, even more preferably from 0.5 to 0.8 µm, and particularly from 0.6 to 0.7 µm. When these ranges are obeyed, film rupture during molding operations can be readily stopped because the frictional force between the film and film molding equipment can be satisfactorily reduced and the stress applied to the film can then be relaxed. In addition, because the film-to-film frictional force is satisfactorily reduced, the introduction of wrinkles or creases during winding of the film into roll form can be easily prevented. Film rupture during film post-processing is also easily prevented.

The surface roughness (Ra) of the film surface and the distance between adjacent peaks in the texturing can be measured using a scanning probe microscope.

In specific terms, using a scanning probe microscope (SPI3800N SPA400) from SII NanoTechnology Inc., in AFM mode, a profile curve of the film surface is obtained by carrying out an atomic force microscope measurement scan of the film surface over a 40 μm square range. Applying the method described in JIS R1683:2007 to the film, the arithmetic mean roughness of the surface is determined from the obtained profile curve and this is taken to be the surface roughness Ra.

With regard to the distance between adjacent peaks in the texturing, a profile curve of the film surface is obtained by carrying out the same measurement as for the Ra and the distance between adjacent peaks in the texturing is measured from this profile curve and is determined as the average for ten randomly selected points. The details of the measurement conditions are given below.

measurement mode: AFM mode
scanner: 150 μm$^2$
measurement area: 40 μm×40 μm
amount of deflection: −0.1
scan frequency: 1.00 Hz
X data points: 512
Y data points: 512
cantilever: SN-AF01 100 μm triangular The polyamide resin (A) film obtained as described above has a thickness of preferably 5 to 100 μm, more preferably 10 to 60 μm, even more preferably 10 to 40 μm, and particularly preferably 10 to 30 μm. At greater than 100 μm, the obtained polyamide resin film is too thick, which then results in a poor impregnation behavior into the fibrous material (B) and/or in a large amount of warping, making it difficult to obtain the desired composite material. The lower limit is preferably 5 μm based on productivity considerations.

4.3 The Polyamide Resin (A) Fiber

When the polyamide resin (A) is used as a fibrous material, it may be, for example, a fiber, monofilament, multifilament, thread, twisted fiber, twisted yarn, cord, stretched fiber, rope, fiber in which the denier varies in the length direction, fiber in which the fiber surface is roughened, a woven fabric of the preceding, a yarn, or a nonwoven fabric.

With regard to the fineness of the polyamide resin (A) fiber, the total fineness is preferably 10 to 100 tex. The use of this range tends to provide an excellent formability, e.g., excellent spreading by the polyamide resin (A) fiber. The total fineness is more preferably from 20 to 80 tex and even more preferably 30 to 60 tex. The monofilament fineness is preferably 0.1 to 3 tex, more preferably 0.3 to 2 tex, and even more preferably 0.5 to 1 tex. The use of the indicated range tends to provide an excellent strength for the polyamide resin (A) fiber and to provide an excellent processability when the polyamide resin (A) is impregnated into the fibrous material (B).

The total fineness can be determined by measuring the weight of any length of the multifilament and converting to the weight per 1,000 m. The monofilament fineness can be determined by dividing the total fineness by the number of filaments in the multifilament.

The tensile strength of the fiber is preferably 1 to 10 gf/d, more preferably 2 to 6 gf/d, and even more preferably 3 to 5 gf/d.

Among the preceding, the polyamide resin (A) fiber is preferably a multifilament and preferably has a tensile strength of 2 to 5 gf/d.

The tensile strength is determined as the strength per unit fineness by carrying out tensile testing on the multifilament at 23° C./50% RH using a tensile tester and dividing the maximum stress by the fineness.

5. Production of the Polyamide Resin (A)/Fibrous Material (B) Composite Material The film-form or fiber-form polyamide resin (A) is stacked with the fibrous material (B); all or at least a portion of the polyamide resin (A) is melted and impregnated into the fibrous material (B) layer; and the resulting impregnation product is consolidated (compacted) by the application of heat and pressure to yield a composite material. The stacking of the fibrous material (B) and the film-form or fiber-form polyamide resin (A) can be performed by a known method; for example, while the film or fiber of the polyamide resin (A) is being transported on rollers, the fibrous material may be co-fed therewith and lamination may be performed with a pressure roll.

The process of impregnating the polyamide resin (A) into the fibrous material (B) is preferably carried out by the continuous application of pressure by a plurality of rolls in a heated atmosphere. The continuous application of pressure makes it possible to expel the air incorporated within the fibrous material (B) from the composite material or from the molding obtained by molding the composite material and thereby makes it possible to minimize the voids in the composite material or in the molding obtained by molding the composite material.

While there are no particular limitations on the roll material, a roll having a fluororesin-coated roll surface is preferably used in order to prevent the polyamide resin (A) from sticking to the roll during the application of heat and pressure.

When the aforementioned pressure-application step employs a step in which bobbin-wound fibrous material (B) is pressed, while being spread, with the polyamide resin (A) film or fiber, or a step in which bobbin-wound fibrous material (B) monofilament is pressed, while being fed out, with the polyamide resin (A) film or fiber, the average fiber diameter of the fibrous material (B) is preferably 1 to 100 μm, more preferably 3 to 50 μm, even more preferably 4 to 20 μm, and particularly preferably 5 to 10 μm. When this range is used, the obtained composite material or molding therefrom tends to have an excellent strength.

The polyamide resin (A) film or fiber for the impregnation step preferably has a certain heat capacity of crystallization, and a heat capacity of crystallization of at least 5 J/g is preferred. This adjustment of the heat capacity of crystallization of the polyamide resin (A) film or fiber results in facile dissolution and melting of the polyamide resin (A), a low energy for heating and pressure application during impregnation, and a shortening of the time required for the impregnation process. The heat capacity of crystallization is more preferably 6 to 60 J/g and even more preferably is 10 to 50 J/g. The heat capacity of crystallization referenced in the present invention is the amount of heat capacity for the exothermic peak during temperature elevation as observed during DSC measurement. For its measurement, for example, the heat capacity of crystallization can be determined from the exothermic peak observed by heating from room temperature at a rate of temperature rise of 10° C./minute to at least the temperature of the anticipated melting point using a "DSC-60" from the Shimadzu Corporation, a sample size of approximately 5 mg, and a nitrogen flow of 30 mL/minute for the gas atmosphere.

The polyamide resin (A) film or fiber preferably contains a certain amount of moisture in the impregnation step because this exercises a plasticizing effect. This moisture content is preferably from 0.01 to 0.15 mass %. By having the moisture content be in this range, the fluidity can be improved during impregnation of the polyamide resin (A) film or fiber and penetration within the fibrous material (B) is facilitated, while few bubbles will be present in the composite material or the molding obtained by molding the composite material and moisture-induced foaming can be prevented. The moisture content is more preferably from 0.04 to 0.12 mass % and even more preferably from 0.05 to 0.1 mass %. The moisture content can be determined by measurement using the Karl Fischer method for 30 minutes at the melting point of the polyamide resin (A)−5° C.

The application of heat and pressure may be carried out using a stack of at least a plurality of plies in which the fibrous material (B) is stacked or laminated with the polyamide resin (A) film or fiber. When stacking of at least a plurality of plies is employed, the application of heat and pressure is desirably carried out on a stack of at least two plies and preferably at least five plies of a polyamide resin (A) film/fibrous material (B) laminate, wherein stacking has been performed so as to have both of the outer sides of the stack be the polyamide resin layer.

The temperature during the application of heat and pressure for impregnation of the polyamide resin (A) into the fibrous material (B) layer with the formation of a single article thereof, must be at least a temperature at which the polyamide resin (A) becomes thermoplastic. While this will vary as a function of the type and molecular weight of the polyamide resin (A), the temperature range from at least the glass-transition temperature of the polyamide resin (A)+10° C. to the thermal degradation temperature−20° C. is generally preferred. For a polyamide resin (A) that has a melting point, at least the melting point+10° C. is preferred and at least the melting point+20° C. is more referred. By carrying out the application of heat and pressure in the indicated temperature range, an even better impregnation of the polyamide resin (A) into the fibrous material (B) can be performed, while an upward trend is seen for the properties of the composite material and molding provided by molding the composite material. When the polyamide resin (A) has two or more melting points, the melting point referenced here is the temperature of the peak top of the endothermic peak at the higher or highest temperature.

The pressing pressure during the application of pressure is preferably at least 0.1 MPa and more preferably is at least 0.5 MPa and particularly preferably is at least 1 MPa. The application of heat and pressure is preferably carried out under reduced pressure and particularly preferably is carried out under a vacuum. Operations under this condition are preferred because this inhibits the residual presence of bubbles in the resulting composite material.

The heat capacity of crystallization for the polyamide resin (A) present in the composite material is preferably at least 5 J/g in those instances in which the composite material of the present invention will be further heated and melted and processed into a molding. The heat capacity of crystallization is more preferably 6 to 60 J/g and is even more preferably 10 to 50 J/g. When this range is satisfied, an excellent moldability is obtained when the composite material is processed into a molding. In addition, the composite material exhibits a suitable flexibility that provides excellent winding characteristics when the composite material is to be stored wound in roll form.

The composite material of the present invention produced as described in the preceding may be a solid, a semisolid, or a viscous solid, but there are no particular limitations on its state. It will generally be a solid or semisolid. The composite material preferably is capable of being stored wound into a roll. In addition, because the polyamide resin (A) is thermoplastic, moldings can be prepared by a variety of molding methods by subjecting the composite material to additional thermal processing.

The polyamide resin (A)/fibrous material (B) area ratio in the cross section of the composite material of the present invention is preferably from 20/80 to 80/20. The strength of the composite material and moldings obtained therefrom tends to be even better when this range is obeyed. The area ratio in the cross section is more preferably 30/70 to 70/30 and even more preferably is 40/60 to 60/40. For the case in which the fibrous material (B) is oriented in a single direction, the cross section referenced here denotes the cross section perpendicular to the long direction of the fibrous material (B). For the case in which the fibrous material (B) is oriented in a plurality of directions, any single direction is selected from the plurality of directions of orientation and the cross section is then the surface perpendicular to the long direction of the fibrous material (B) having this orientation. When the fibrous material (B) is not orientated, any single direction in the composite material is used for the cross section. The polyamide resin (A)/fibrous material (B) area ratio can be determined by observation of the cross section with a scanning electron microscope (SEM).

Since the melting polyamide resin may undergo outflow during the application of heat and pressure, the area ratio in the composite material cross section may not necessarily be the area ratio that can be calculated from the mass of the polyamide resin (A) used, the mass of the fibrous material (B) used, and their densities. An excellent strength is obtained for the molding by bringing the area ratio into the range indicated above.

The composite material of the present invention can be made into a compact or consolidated composite material having few voids, and the void area ratio in the cross section is preferably not more than 5%, more preferably not more than 3%, and even more preferably not more than 2%. The cross section referenced here has the same definition as the cross section for the previously described polyamide resin (A)/fibrous material (B) area ratio in the cross section. The void area ratio in the cross section can be determined by SEM observation.

6. Production of Moldings from the Composite Material

The composite material provided by the previously described methods preferably has a structure in which both of its surfaces are formed by a polyamide resin (A) layer.

The composite material of the present invention, because it comprises a thermoplastic resin material, may be used as a molding material, either directly or cut to a desired shape and size. A variety of moldings can be obtained by preferably heating the composite material of the present invention and then preferably introducing this into a heated mold, molding, and demolding. This forming operation is not limited to methods that use a mold, and, for example, can also be performed using rolls. The composite material may also be molded preferably by heating and then preferably by the application of pressure using heated rolls.

The heating temperature in those instances in which heat is applied to the composite material during molding is preferably from the melting point of the polyamide resin (A) to its melting point+30° C. The pressure during molding is preferably at least 0.1 MPa, more preferably at least 0.5 MPa, and even more preferably at least 1 MPa. The temperature of the mold (preferably a die) during molding is preferably from 70 to 150° C., more preferably 80 to 130° C., and even more preferably 90 to 120° C.

There are no particular limitations on the method for converting the composite material of the present invention to a molding, and the heretofore known technologies can be used; for example, compression molding, vacuum molding, vacuum compression molding, pressure forming, and so forth, can be employed.

A molding obtained by molding the composite material may also be subjected to an additional heat treatment. Subjecting the molding to a heat treatment serves to provide a small warpage and to make possible additional improvements in the dimensional stability. The heat treatment temperature is preferably from 80 to 180° C., more preferably from 100 to 170° C., and even more preferably from 120 to 160° C. When the indicated range is obeyed, crystallization of the polyamide resin (A) proceeds rapidly, there is little warping in the obtained molding, and the dimensional stability can be further improved.

The heat capacity of crystallization of the polyamide resin (A) in the molding is preferably less than 5 J/g. The strength of the molding tends to be further improved by crystallization to this range. The heat capacity of crystallization is more preferably less than 4 J/g and even more preferably is less than 3 J/g.

The polyamide resin (A)/fibrous material (B) area ratio in the cross section for a molding obtained by molding the composite material is preferably 20/80 to 80/20. Obeying this range tends to provide additional improvements in the strength of the molding. The area ratio in the cross section is more preferably 30/70 to 70/30 and even more preferably is 40/60 to 60/40. The polyamide resin (A)/fibrous material (B) cross-sectional area ratio can be determined for the molding by the same method as for measurement of the area ratio in the composite material.

The molding obtained by molding the composite material is preferably executed as a low-void compacted or consolidated molding. The void area ratio in the cross section is preferably not more than 5%, more preferably not more than 3%, and even more preferably not more than 2%. The void area ratio in the cross section in the molding can be determined by the same method as used to measure the void area ratio in the composite material.

The fiber length of the fibrous material (B) present in a molding obtained by molding the composite material, expressed as the average fiber length, is preferably at least 1 cm, more preferably at least 1.5 cm, even more preferably at least 2 cm, and particularly preferably at least 3 cm. The upper limit for the average fiber length will vary with the particular application, but is preferably not more than 500 cm, more preferably not more than 300 cm, and even more preferably not more than 100 cm.

There are no particular limitations on the method of measuring the average fiber length in a molding, but, for example, the length can be measured on the fibers remaining after the polyamide resin has been dissolved by dissolving the composite material in hexafluoroisopropanol (HFIP). Measurement can be carried out by visual observation or, depending on the circumstances, by observation with, for example, an optical microscope or a scanning electron microscope (SEM). The length of 100 randomly selected fibers is measured and the average fiber length (number-average) is calculated.

When a molding is intended for an application or service where surface smoothness or a premium presentation is a particular requirement, a polyamide resin layer is preferably also placed on the surface of the obtained molding. The following methods, for example, can be used to place this polyamide resin layer: laying, heating, and melt bonding a polyamide resin film on the surface of the molding; immersing the molding in a polyamide resin melt; and applying a coating of polyamide resin powder and then melting.

In those instances in which a polyamide resin layer is additionally placed on the surface of the molding, the thickness of the polyamide layer is preferably from 1 to 1,000 μm, more preferably 3 to 500 μm, and particularly preferably 5 to 100 μm.

The resin used for the polyamide resin layer is preferably the polyamide resin (A), but is not necessarily limited thereto, and other polyamide resins can also be used, for example, polyamide 6, polyamide 66, polyamide 11, polyamide 12, polyamide 46, polyamide 6/10, polyamide 6/12, polyamide 6/66, and so forth.

7. Other Components for the Polyamide Resin (A)

7.1 Short Fiber (D)

The polyamide resin (A) preferably also contains short fibers (D) of the fibrous material (B). This short fiber (D) of the fibrous material (B) has an average fiber length smaller than that of the fibrous material (B) and preferably also has an average fiber diameter smaller than that of the fibrous material (B). A specific and typical example is so-called chopped strand. In preferred examples thereof, the average fiber diameter is 1 to 100 μm and particularly 3 to 50 μm and the average fiber length is 0.02 to 30 mm and particularly 0.1 to 20 mm. This short fiber (D) is preferably preliminarily compounded into the polyamide resin (A). The short fiber (D) may be of the same type as the fibrous material (B) or may be of a different type, but the use of the same type as the fibrous material (B) is preferred.

By having the short fiber (D) fibrous material be present, short fibers then spread or penetrate into detail or fine regions of the composite material or molding obtained by molding the composite material, and this tends to raise the strength in particular even in those instances in which the molding has, for example, an L-shaped end region or a hinge region. On the other hand, the strength may be unsatisfactory when such a short fiber is used entirely for the fibrous material (B) from the outset.

Additives may also be added to the polyamide resin (A) within a range that does not impair the effects of the present invention. These additives can be exemplified by stabilizers such as oxidation inhibitors and heat stabilizers, agents that improve the resistance to hydrolysis, weathering stabilizers, delustrants, ultraviolet absorbers, nucleating agents, plasticizers, dispersants, flame retardants, static inhibitors, discoloration inhibitors, gelation inhibitors, colorants, release agents, and so forth.

7.2 Stabilizers

A stabilizer (oxidation inhibitor, heat stabilizer) is preferably incorporated in the polyamide resin (A) of the present invention. Preferred examples of this stabilizer are organic stabilizers such as phosphorus types, hindered phenol types, hindered amine types, oxalic anilide types, organic sulfur types, and aromatic secondary amine types, as well as amine-type oxidation inhibitors and inorganic stabilizers such as copper compounds and halides. Phosphite compounds and phosphonite compounds are preferred for the phosphorus-type stabilizers.

The phosphite compounds can be exemplified by distearyl pentaerythritol diphosphite, dinonylphenyl pentaerythritol diphosphite, bis(2,4-di-t-butylphenyl)pentaerythritol diphosphite, bis(2,6-di-t-butyl-4-methylphenyl) pentaerythritol diphosphite, bis(2,6-di-t-butyl-4-ethylphenyl) pentaerythritol diphosphite, bis(2,6-di-t-butyl-4-isopropylphenyl) pentaerythritol diphosphite, bis(2,4,6-tri-t-butylphenyl) pentaerythritol diphosphite, bis(2,6-di-t-butyl-4-sec-butylphenyl) pentaerythritol diphosphite, bis(2,6-di-t-butyl-4-t-octylphenyl)pentaerythritol diphosphite, and bis(2,4-dicumylphenyl)pentaerythritol diphosphite, wherein bis(2,6-di-t-butyl-4-methylphenyl) pentaerythritol diphosphite and bis (2,4-dicumylphenyl) pentaerythritol diphosphite are particularly preferred.

The phosphonite compounds can be exemplified by tetrakis(2,4-di-t-butylphenyl)-4,4'-biphenylenediphosphonite, tetrakis(2,5-di-t-butylphenyl)-4,4'-biphenylenediphosphonite, tetrakis(2,3,4-trimethylphenyl)-4,4'-biphenylenediphosphonite, tetrakis(2,3-dimethyl-5-ethylphenyl)-4,4'-biphenylenediphosphonite, tetrakis(2,6-di-t-butyl-5-ethylphenyl)-4,4'-biphenylenediphosphonite, tetrakis(2,3,4-tributylphenyl)-4,4'-biphenylenediphosphonite, and tetrakis (2,4,6-tri-t-butylphenyl)-4,4'-biphenylenediphosphonite, wherein tetrakis(2,4-di-t-butylphenyl)-4,4'-biphenylenediphosphonite is particularly preferred.

The hindered phenol-type stabilizers can be exemplified by n-octadecyl 3-(3,5-di-t-butyl-4-hydroxyphenyl)propionate, 1,6-hexanediol bis[3-(3,5-di-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl)propionyloxy} ethyl]-2,4, 8,10-tetraoxaspiro[5,5]undecane, triethylene glycol bis[3-(3-t-butyl-5-methyl-4-hydroxyphenyl)propionate], 3,5-di-t-butyl-4-hydroxybenzylphosphonate diethyl ester, 1,3,5-trimethyl-2,4,6-tris(3,5-di-t-butyl-4-hydroxybenzyl) benzene, 2,2-thiodiethylenebis[3-(3,5-di-t-butyl-4-hydroxyphenyl)propionate], tris(3,5-di-t-butyl-4-hydroxybenzyl)isocyanurate, and N,N'-hexamethylenebis(3, 5-di-t-butyl-4-hydroxyhydrocinnamide). n-octadecyl 3-(3,5-di-t-butyl-4-hydroxyphenyl)propionate, 1,6-hexanediol bis [3-(3,5-t-butyl-4-hydroxyphenyl)propionate], pentaerythritol tetrakis[3-(3,5-di-t-butyl-4-hydroxyphenyl) propionate], 3,9-bis[1,1-dimethyl-2-{β-(3-t-butyl-4-hydroxy-5-methylphenyl)propionyloxy}ethyl]-2,4,8,10-tetraoxaspiro[5,5]undecane, and N,N'-hexamethylenebis(3,5-di-t-butyl-4-hydroxyhydrocinnamide) are preferred among the preceding.

The hindered amine-type stabilizers can be exemplified by the well-known hindered amine compounds that have the 2,2,6,6-tetramethylpiperidine skeleton. The hindered amine-type compounds can be specifically exemplified by 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperidine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl) carbonate, bis(2,2,6,6-tetramethyl-4-piperidyl) oxalate, bis (2,2,6,6-tetramethyl-4-piperidyl)malonate, bis(2,2,6,6-tetramethyl-4-piperidyl) sebacate, bis(2,2,6,6-tetramethyl-4-piperidyl) adipate, bis(2,2,6,6-tetramethyl-4-piperidyl) terephthalate, 1,2-bis(2,2,6,6-tetramethyl-4-piperidyloxy) ethane, α,α'-bis(2,2,6,6-tetramethyl-4-piperidyloxy)-p-xylene, bis(2,2,6,6-tetramethyl-4-piperidyltolylene)-2,4-dicarbamate, bis(2,2,6,6-tetramethyl-4-piperidyl)hexamethylene-1,6-dicarbamate, tris(2,2,6,6-tetramethyl-4-piperidyl) benzene-1,3,5-tricarboxylate, tris(2,2,6,6-tetramethyl-4-piperidyl)benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]-2,2,6,6-tetramethylpiperidine, the condensate of 1,2,3,4-butanetetracarboxylic acid with 1,2,2,6,6-pentamethyl-4-piperidinol and β,β,β',β'-tetramethyl-3,9-[2,4,8,10-tetraoxaspiro(5,5)undecane]diethanol, dimethyl succinate-1-(2-hydroxylethyl)-4-hydroxy-2,2,6,6-tetramethylpiperidine polycondensate, and 1,3-benzenedicarboxamide-N,N'-bis(2,2,6,6-tetramethyl-4-piperidyl).

The following are examples of commercially available hindered amine-type stabilizers: the "ADK STAB LA-52, LA-57, LA-62, LA-67, LA-63P, LA-68LD, LA-77, LA-82, and LA-87" products from the ADEKA CORPORATION; the "TINUVIN 622, 944, 119, 770, and 144" products from Ciba Specialty Chemicals Inc.; the "SUMISORB 577" product from the Sumitomo Chemical Company; the "CYASORB UV-3346, 3529, and 3853" products from the American Cyanamid Company; and the "Nylostab S-EED" product from Clariant Japan.

Amine-type oxidation inhibitors are amine-type compounds other than the above-described hindered amine-type stabilizers, and, for example, the reaction product of 2,4,4-trimethylpentene with N-phenylbenzenamine (IRGANOX 5057), which is commercially available under the indicated trade name from Ciba Specialty Chemicals Inc., and octylated diphenylamine (NOCRAC AD-F), N,N'-diphenyl-p-phenylenediamine (NOCRAC DP), N-phenyl-N'-isopropyl-p-phenylenediamine (NOCRAC 810-NA), N-phenyl-N'-(1, 3-dimethylbutyl)-p-phenylenediamine (NOCRAC 6C), N,N'-di-2-naphthyl-p-phenylenediamine (NOCRAC White), 2,2,4-trimethyl-1,2-dihydroquinoline polymer (NOCRAC 224), and 6-ethoxy-1,2-dihydro-2,2,4-trimethylquinoline (NOCRAC AW), which are commercially available under the indicated trade names from Ouchi Shinko Chemical Industrial Co., Ltd., can be used.

Preferred examples of the oxalic anilide-type stabilizers are 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxanilide, 2-ethoxy-5-tert-butyl-2'-ethoxanilide and its mixture with 2-ethoxy-2'-ethyl-5,4'-di-tert-butoxanilide, o- and p-methoxy-disubstituted-oxanilide mixtures, and o- and p-ethoxy-disubstituted-oxanilide mixtures.

The organic sulfur-type stabilizers can be exemplified by organic thioacid compounds such as didodecyl thiodipropionate, ditetradecyl thiodipropionate, dioctadecyl thiodipropionate, pentaerythritol tetrakis(3-dodecylthiopropionate), and thiobis(N-phenyl-β-naphthylamine); mercaptobenzoimidazole compounds such as 2-mercaptobenzothiazole, 2-mercaptobenzoimidazole, 2-mercaptomethylbenzoimidazole, and metal salts of 2-mercaptomethylbenzoimidazole and 2-mercaptobenzoimidazole; dithiocarbamic acid compounds such as the metals salts of diethyldithiocarbamic acid and the metal salts of dibutyldithiocarbamic acid;

thiourea compounds such as 1,3-bis(dimethylaminopropyl)-2-thiourea and tributylthiourea; as well as tetramethylthiuram monosulfide, tetramethylthiuram disulfide, nickel dibutyldithiocarbamate, nickel isopropyl xanthate, and trilauryl trithiophosphite.

Preferred among the preceding are mercaptobenzoimidazole compounds, dithiocarbamic acid compounds, thiourea compounds, and organic thioacid compounds, while mercaptobenzoimidazole compounds and organic thioacid compounds are more preferred. Thioether compounds having a thioether structure in particular can be suitably used to carry out reduction by accepting oxygen from an oxidized substance. Specifically, 2-mercaptobenzoimidazole, 2-mercaptomethylbenzoimidazole, ditetradecyl thiodipropionate, dioctadecyl thiodipropionate, and pentaerythritol tetrakis(3-dodecylthiopropionate) are more preferred; ditetradecyl thiodipropionate, pentaerythritol tetrakis(3-dodecylthiopropionate), and 2-mercaptobenzoimidazole are even more preferred; and pentaerythritol tetrakis(3-dodecylthiopropionate) is particularly preferred.

The molecular weight of the organic sulfur compound will generally be at least 200 and is preferably at least 500, while its upper limit is generally 3,000.

The aromatic secondary amine stabilizer is preferably a compound having a diphenylamine skeleton, a compound having a phenylnaphthylamine skeleton, or a compound having a dinaphthylamine skeleton, wherein compounds having a diphenylamine skeleton and compounds having a phenylnaphthylamine skeleton are more preferred. Compounds having a diphenylamine skeleton can be specifically exemplified by p,p'-dialkyldiphenylamine (wherein the alkyl group contains from 8 to 14 carbons), octylated diphenylamine, 4,4'-bis(α,α-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine, and N-phenyl-N'-(3-methacryloyloxy-2-hydroxypropyl)-p-phenylenediamine; compounds having a phenylnaphthylamine skeleton can be specifically exemplified by N-phenyl-1-naphthylamine and N,N'-di-2-naphthyl-p-phenylenediamine; and compounds having a dinaphthylamine skeleton can be specifically exemplified by 2,2'-dinaphthylamine, 1,2'-dinaphthylamine, and 1,1'-dinaphthylamine. More preferred among the preceding are 4,4'-bis(α,α-dimethylbenzyl)diphenylamine, N,N'-di-2-naphthyl-p-phenylenediamine, and N,N'-diphenyl-p-phenylenediamine, while N,N'-di-2-naphthyl-p-phenylenediamine and 4,4'-bis(α,α-dimethylbenzyl)diphenylamine are particularly preferred.

When the previously described organic sulfur-type stabilizer or aromatic secondary amine stabilizer is incorporated, their co-use is then preferred. Their co-use tends to provide the polyamide resin composition with a better thermal ageing resistance than does their individual use.

In more specific terms, suitable combinations of the organic sulfur-type stabilizer and aromatic secondary amine stabilizer can be exemplified by the combination of at least one selection from ditetradecyl thiodipropionate, 2-mercaptomethylbenzoimidazole, and pentaerythritol tetrakis(3-dodecylthiopropionate) for the organic sulfur-type stabilizer with at least one selection from 4,4'-bis(α,α-dimethylbenzyl)diphenylamine and N,N'-di-2-naphthyl-p-phenylenediamine for the aromatic secondary amine stabilizer. In a more preferred combination, the organic sulfur-type stabilizer is pentaerythritol tetrakis(3-dodecylthiopropionate) and the aromatic secondary amine stabilizer is N,N'-di-2-naphthyl-p-phenylenediamine.

When an organic sulfur-type stabilizer is used in combination with an aromatic secondary amine stabilizer, their content ratio (mass ratio) in the polyamide resin composition is preferably aromatic secondary amine stabilizer/organic sulfur-type stabilizer=0.05 to 15, more preferably 0.1 to 5, and even more preferably 0.2 to 2. By using such a content ratio, the resistance to thermal ageing can be efficiently improved while maintaining the barrier properties.

The inorganic stabilizer is preferably a copper compound or a halide.

The copper compound is a copper salt of various inorganic acids and organic acids and excludes the halides described below. The copper may be either copper(I) or copper(II), and the copper salt can be specifically exemplified by copper chloride, copper bromide, copper iodide, copper phosphate, and copper stearate and by naturally occurring minerals such as hydrotalcite, stichtite, and pyrolite.

The halide used as the inorganic stabilizer is, for example, an alkali metal halide, alkaline-earth metal halide, ammonium halide, the halide of a quaternary ammonium organic compound, or an organic halide such as an alkyl halide or aryl halide. Specific examples are ammonium iodide, stearyltriethylammonium bromide, and benzyltriethylammonium iodide. Preferred thereamong are alkali metal halides such as potassium chloride, sodium chloride, potassium bromide, potassium iodide, and sodium iodide.

The use of a copper compound in combination with a halide, and particularly the use of a copper compound in combination with an alkali metal salt, is preferred because this generates an excellent effect with regard to the resistance to thermal discoloration and resistance to weathering (light resistance). For example, when a copper compound is used by itself, the molding may take on a reddish brown color due to the copper, and this color may be undesirable depending on the particular application. In this case, the color change to reddish brown can be stopped by the co-use of the copper compound with a halide.

Among the stabilizers described above, amine-type oxidation inhibitors, inorganic stabilizers, organic sulfur-type stabilizers, and aromatic secondary amine stabilizers are particularly preferred in the present invention from the standpoint of the processing stability during the application of heat and pressure, the thermal ageing resistance, the film appearance, and the inhibition of discoloration.

The stabilizer content, expressed per 100 mass parts of the polyamide resin (A), is generally 0.01 to 1 mass part and preferably 0.01 to 0.8 mass parts. The use of a content of at least 0.01 mass parts makes possible a satisfactory manifestation of the effects of improving the thermal discoloration and improving the weathering resistance/light resistance. The use of not more than 1 mass part for the quantity of incorporation makes possible an inhibition of mechanical property reductions.

7.3 Agents that Improve the Resistance to Hydrolysis: Carbodiimide Compounds

A carbodiimide compound is preferably incorporated in the polyamide resin (A) as an agent that improves the resistance to hydrolysis. Preferred examples of this carbodiimide compound are the aromatic, aliphatic, and alicyclic polycarbodiimide compounds produced by various methods. Among these, the use of aliphatic and alicyclic polycarbodiimide compounds is preferred from the standpoint of the melt mixability/kneadability during, for example, extrusion, while the use of alicyclic polycarbodiimide compounds is more preferred.

These carbodiimide compounds can be prepared by the decarboxylation/condensation reaction of an organic polyisocyanate. This can be exemplified by a method in which synthesis is carried out by performing a decarboxylation/condensation reaction on any of various organic polyisocyanates at a temperature of approximately 70° C. or above in the presence of a carbodiimidation catalyst, either without using a solvent or in an inert solvent. The isocyanate group content is preferably 0.1 to 5% and more preferably 1 to 3%. The use of this range provides a facile reaction with the polyamide resin (A) and tends to provide an excellent resistance to hydrolysis.

The organic polyisocyanate used as a starting material for carbodiimide compound synthesis can be exemplified by various organic diisocyanates such as aromatic diisocyanates, aliphatic diisocyanates, and alicyclic diisocyanates and their mixtures.

The organic diisocyanates can be specifically exemplified by 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, and methylenebis(4,1-cyclohexylene)=diisocyanate. Two or more of these may be used in combination. Dicyclohexylmethane-4,4-diisocyanate and methylenebis(4,1-cyclohexylene)=diisocyanate are preferred among the preceding.

An end-capping agent, e.g., a monoisocyanate, is preferably also used in order to cap the terminals of the carbodiimide compound and control its degree of polymerization. This monoisocyanate can be exemplified by phenyl isocyanate, tolyl isocyanate, dimethylphenyl isocyanate, cyclohexyl isocyanate, butyl isocyanate, and naphthyl isocyanate, and two or more monoisocyanates can be used in combination.

The end-capping agent is not limited to the monoisocyanate referenced above and may be any active hydrogen compound capable of reacting with isocyanate. Among aliphatic, aromatic, and alicyclic compounds, this active hydrogen compound can be exemplified by compounds that contain the —OH group, e.g., methanol, ethanol, phenol, cyclohexanol, N-methylethanolamine, polyethylene glycol monomethyl ether, and polypropylene glycol monomethyl ether; secondary amines such as diethylamine and dicyclohexylamine; primary amines such as butylamine and cyclohexylamine; carboxylic acids such as succinic acid, benzoic acid, and cyclohexanecarboxylic acid; thiols such as ethyl mercaptan, allyl mercaptan, and thiophenol; and epoxy-functional compounds. Two or more of these may be used in combination.

The carbodiimidation catalyst can be exemplified by phosphorene oxides, e.g., 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and their 3-phospholene isomers, and by metal catalysts such as tetrabutyl titanate. Among the preceding, 3-methyl-1-phenyl-2-phospholene-1-oxide is particularly suitable from a reactivity standpoint. Two or more carbodiimidation catalysts can be used in combination.

The content of the carbodiimide compound, expressed per 100 mass parts of the polyamide resin (A), is preferably 0.1 to 2 mass parts, more preferably 0.2 to 1.5 mass parts, and even more preferably 0.3 to 1.5 mass parts. At less than 0.1 mass part, the resin composition does not have a satisfactory hydrolysis resistance and uneven ejection is then prone to occur during melt mixing/kneading, e.g., extrusion, and melt mixing/kneading is prone to be unsatisfactory. When, on the other hand, 2 mass parts is exceeded, the resin composition undergoes a substantial increase in viscosity during melt mixing/kneading and the melt mixability/kneadability and molding processability are then prone to deteriorate.

EXAMPLES

The present invention is more particularly described by the examples and comparative examples given below, but the present invention is not limited to these examples.

[Methods for Measuring the Properties of the Polyamide Resin (A)]

The melting point, glass-transition temperature, melt viscosity, number-average molecular weight (Mn), molecular weight distribution (Mw/Mn), content of component with a molecular weight of not more than 1,000, cyclic compound content, terminal amino group concentration ([$NH_2$]), terminal carboxyl group concentration ([COOH]), ratio of the terminal amino group concentration to the terminal carboxyl group concentration ([$NH_2$]/[COOH]), reaction molar ratio (r), moisture absorption rate, and flexural modulus retention rate upon moisture absorption were measured as described below on the polyamide resins used in the examples and comparative examples. The results are shown in the tables given below.

(The Melting Point and Glass-Transition Temperature of the Polyamide Resin (A))

Using differential scanning calorimetry (DSC), the polyamide resin was melted using a DSC-60 from the Shimadzu Corporation by heating from 30° C. at a rate of 10° C./minute to at least the temperature of the anticipated melting point. The melting point was determined from the temperature at the peak top of the endothermic peak during this process. After melting, the sample was cooled with dry ice and the glass-transition temperature was then determined by heating at a rate of 10° C./minute to at least the melting point temperature.

(The Melt Viscosity)

The measurement was carried out using the following conditions and a Capillograph D-1 from Toyo Seiki Seisaku-sho, Ltd.: die=1 mmΦ×10 mm length, apparent shear rate=122 sec$^{-1}$, measurement temperature=melting point+30° C., and moisture content of the polyamide resin not more than 0.06 mass %. When the polyamide resin (A) had two or more melting points, the measurement was carried out using the temperature at the peak top of the endothermic peak at the higher or highest temperature for the melting point.

(The Number-Average Molecular Weight (Mn))

This was calculated using the following formula from the terminal amino group concentration [$NH_2$] (μequivalent/g) and the terminal carboxyl group concentration [COOH] (μequivalent/g) of the polyamide resin as determined by titration to neutrality as described below.

number-average molecular weight=2,000,000/([COOH]+[$NH_2$])

(The Molecular Weight Distribution (Mw/Mn))

The measurement was carried out using an "HLC-8320GPC" from the TOSOH Corporation, two "TSKgel SuperHM-H" columns for the column, hexafluoroisopropanol (HFIP) having a sodium trifluoroacetate concentration of 10 mmol/L for the eluent, a resin concentration of 0.02 mass %, a column temperature of 40° C., a flow rate of 0.3 mL/minute, and a refractive index detector (RI). The value was determined as the standard polymethylmethacrylate (PMMA) value. The calibration curve was measured at 6 levels of PMMA dissolved in HFIP.

(Content of Component with a Molecular Weight of not More than 1,000)

The content of component with a molecular weight of not more than 1,000 was determined by calculation from the measured curve using the analytic software provided with the HLC-8320GPC (TOSOH Corporation) used in the previously described GPC measurement.

(The Cyclic Compound Content)

Pellets of the polyamide resin (A) obtained by a method as described below were ground using an ultracentrifugal grinder; the result was loaded on a 0.25 mmΦ sieve; and 10 g of a powder sample less than or equal to 0.25 mmΦ was measured into an extraction thimble. This was followed by Soxhlet extraction for 9 hours with 120 mL methanol. The resulting extract was concentrated to 10 mL with an evaporator taking care to avoid evaporation to dryness. Oligomer that precipitated at this point was removed by passing the liquid through a suitable PTFE filter. The obtained extract was diluted 50× with methanol to yield a solution that was submitted to the measurement. The cyclic compound content was determined by performing quantitative analysis using a high-performance liquid chromatograph (HPLC) from Hitachi High-Technologies Corporation.

The details for the HPLC instrument are as follows.
LC: HITACHI LC system
Detector: HITACHI L-7400 (UV: 220 nm)
Column: GL Sciences Inertsil ODS-3
 (Φ4.6×150 mm, df=5 μm)
Oven temp.: 40° C.
Injection volume: 20 μL
Carrier: Solvent A: 20 mM $H_3PO_4$
 Solvent B: $CH_3CN$

| Gradient: | 0 minute | 90% A | 10% B |
|---|---|---|---|
| | 23 minutes | 90% A | 10% B |
| | 25 minutes | 0% A | 100% B |
| | 40 minutes | 0% A | 100% B |

Flow rate: 1.0 mL/minute (The Moisture Absorption Rate)

The polyamide resin (A) provided by a method as described below was vacuum dried for 5 hours at 150° C., and a test specimen (ISO test specimen, thickness=4 mm) was then fabricated using a 100T injection molder from FANUC Ltd. The obtained test specimen was immersed for 1 week in distilled water at 23° C. and was then removed and the moisture was wiped off the surface and the moisture absorption rate was measured by the Karl Fischer method. An AQ-2000 trace moisture analyzer from Hiranuma Sangyo Corporation was used for the measurement. The measurement temperature was the melting point of the polyamide resin−5° C., and the measurement time was 30 minutes. When the polyamide resin (A) had two or more melting points, the measurement was carried out using the peak top temperature of the endothermic peak at the higher or highest temperature for the melting point.

(The Terminal Amino Group Concentration ($[NH_2]$))

This was measured by stirring and dissolving, at 20° C. to 30° C., 0.5 g of the polyamide resin (A) obtained by a method as described below in 30 mL of a mixed solvent of phenol/methanol (4:1) and titrating with 0.01 N hydrochloric acid.

(The Terminal Carboxyl Group Concentration ([COOH]))

The measurement was carried out as follows: 0.1 g of the polyamide resin (A) obtained by a method as described below was dissolved in 30 mL benzyl alcohol at 200° C.; 0.1 mL of a Phenol Red solution was added in the range from 160° C. to 165° C.; and the resulting solution was titrated with a titrant prepared by dissolving 0.132 g KOH in 200 mL benzyl alcohol (0.01 mol/L as the KOH concentration).

(the Ratio of the Terminal Amino Group Concentration to the Terminal Carboxyl Group Concentration ($[NH_2]$/$[COOH]$))

This was calculated from the terminal amino group concentration and the terminal carboxyl group concentration determined by the methods described above.

(The Reaction Molar Ratio (r))

This was determined using the following formula as described above.

$$r=(1-cN-b(C-N))/(1-cC+a(C-N))$$

in the formula:
a: M1/2
b: M2/2
c: 18.015 (the molecular weight of water (g/mol))
M1: the molecular weight of the diamine (g/mol)
M2: the molecular weight of the dicarboxylic acid (g/mol)
N: the terminal amino group concentration (equivalent/g)
C: the terminal carboxyl group concentration (equivalent/g)

(The Flexural Modulus Retention Rate Upon Moisture Absorption)

The flexural modulus retention rate upon moisture absorption is defined as the ratio (%) of the flexural modulus when the polyamide resin has absorbed 0.5 mass % moisture to the modulus when a 0.1 mass % moisture absorption has occurred, and was measured as described below.

Using a 100T injection molder from FANUC Ltd., a test specimen (ISO test specimen, thickness=4 mm) was fabricated from the polyamide resin provided by a method as described below. The polyamide resin was vacuum dried for 5 hours at 150° C. prior to molding.

The obtained test specimen was subjected to a heat treatment for 1 hour at 150° C. and was held at 50% RH and 23° C. When the moisture content reached 0.1 mass %, the flexural modulus was determined according to JIS K7171. The measurement was carried using a Strograph from Toyo Seiki Seisaku-sho, Ltd., for the instrument, 23° C. for the measurement temperature, and 50% RH for the measurement humidity.

In addition, a moisture absorption treatment was executed on a test specimen obtained by injection molding by the same method as described above; at 0.5 mass %, the flexural modulus was determined by the same method as before; and the flexural modulus retention rate was determined from the ratio of these values.

[The Polyamide Resin]

The polyamide resin obtained in the following Production Examples 1 to 7 and a commercially available meta-xylylene adipamide resin (MXD6), described below, were used as the polyamide resin (A).

A commercially available polyamide 6, described below, was also used for comparison.

The meta-xylyleneadipamide resin

Product name "MX Nylon Grade S6007" from Mitsubishi Gas Chemical Co., Ltd. Referred to below as "MXD6".

Production Example 1

Polyamide (MXD10) Synthesis

Sebacic acid (product name: Sebacic Acid TA, from Itoh Oil Chemicals Co., Ltd.) was melted in a reactor by heating to 170° C. and the temperature was then raised to 210° C. while stirring the contents under pressurization (0.4 MPa) and gradually dripping in meta-xylylenediamine (from Mitsubishi Gas Chemical Co., Ltd.) so as to give a molar ratio with the sebacic acid of approximately 1:1. After completion of the dripping, pressure reduction was carried out to 0.078 MPa and the reaction was continued for 30 minutes to adjust the amount of component with a molecular weight of not more than 1,000. After the completion of the reaction, the contents were withdrawn in strand form and pelletized at a pelletizer to obtain a polyamide (MXD10). This is referred to below as "MXD10".

Production Example 2

Polyamide (MPXD10) Synthesis

Sebacic acid was heated and melted in a reactor under a nitrogen atmosphere and the temperature was then raised to 235° C. while stirring the contents under pressurization (0.35 MPa) and gradually dripping in a 3:7 (molar ratio) mixed diamine of para-xylylenediamine (from Mitsubishi Gas Chemical Co., Ltd.) and meta-xylylenediamine (from Mitsubishi Gas Chemical Co., Ltd.) so as to give a molar ratio between the diamine and the adipic acid of approximately 1:1. After completion of the dripping, the reaction was continued for 60 minutes to adjust the amount of component with a molecular weight of not more than 1,000. After the completion of the reaction, the contents were withdrawn in strand form and pelletized at a pelletizer to obtain a polyamide (MPXD10). This is referred to below as "MPXD10".

Production Example 3

Polyamide (PXD10) Synthesis

The following were weighed and charged to a 50-L reactor equipped with a stirrer, partial condenser, condenser, thermometer, dropwise addition apparatus, nitrogen inlet tube, and strand die: 8950 g (44.25 mol) precisely weighed sebacic acid (Sebacic Acid TA, from Itoh Oil Chemicals Co., Ltd.), 12.54 g (0.074 mol) calcium hypophosphite, and 6.45 g (0.079 mol) sodium acetate. The interior of the reactor was thoroughly substituted with nitrogen, after which the pressure was raised to 0.4 MPa with nitrogen and, while stirring, the temperature was raised from 20° C. to 190° C. and the sebacic acid was uniformly melted in 55 minutes. Then, while stirring, 5960 g (43.76 mol) para-xylylenediamine (from Mitsubishi Gas Chemical Co., Ltd.) was dripped in; this took 110 minutes. During this time, the temperature in the reactor was continuously raised to 293° C. The pressure in the drip-in step was controlled to 0.42 MPa, and the evolved water was removed from the system by passage through the partial condenser and the condenser. The temperature of the partial condenser was controlled into the 145 to 147° C. range. After completion of the para-xylylenediamine dripping, the polycondensation reaction was continued for 20 minutes at a pressure of 0.42 MPa in the reactor. The temperature in the reactor during this interval was raised to 296° C. After this, the pressure in the reactor was reduced from 0.42 MPa to 0.12 MPa in 30 minutes. The interior temperature was raised to 298° C. during this interval. After this, the pressure was reduced at a rate of 0.002 MPa/minute and was reduced to 0.08 MPa in 20 minutes in order to control the amount of component with a molecular weight of not more than 1,000. The temperature in the reactor was 301° C. when pressure reduction was completed. The interior of the system was then pressurized with nitrogen and the polymer was withdrawn in strand form through the strand die at a reactor interior temperature of 301° C. and a resin temperature of 301° C., and was cooled in 20° C. cooling water and pelletized to obtain approximately 13 kg of a polyamide resin. The cooling time in the cooling water was 5 seconds and the strand withdrawal rate was 100 m/minute. This is referred to below as "PXD10".

Production Example 4

Polyamide (MPXD6) Synthesis

Adipic acid (from Rhodia) was heated and melted in a reactor under a nitrogen atmosphere and the temperature was then raised to 270° C. while stirring the contents under pressurization (0.35 MPa) and gradually dripping in a 3:7 (molar ratio) mixed diamine of para-xylylenediamine (from Mitsubishi Gas Chemical Co., Ltd.) and meta-xylylenediamine (from Mitsubishi Gas Chemical Co., Ltd.) so as to give a molar ratio between the diamine and adipic acid of approximately 1:1. After completion of the dripping, the pressure was reduced to 0.06 MPa and the reaction was continued for 10 minutes to adjust the amount of component with a molecular weight of not more than 1,000. The contents were then withdrawn in strand form and pelletized at a pelletizer to obtain a polyamide (MPXD6). This is referred to below as "MPXD6".

Production Example 5

Polyamide (MXD6I) Synthesis

A mixed dicarboxylic acid of adipic acid (from Rhodia) and isophthalic acid (from A. G. International Chemical Co.) in a 9:1 molar ratio was heated and melted in a reactor under a nitrogen atmosphere. The temperature was then raised to 242° C. while stirring the contents and gradually dripping in meta-xylylenediamine (from Mitsubishi Gas Chemical Co., Ltd.) so as to give a molar ratio between the diamine and dicarboxylic acid of approximately 1:1. After completion of the dripping, pressure reduction was carried out to 0.08 MPa and the reaction was continued for 20 minutes to adjust the amount of component with a molecular weight of not more than 1,000. This was followed by withdrawal of the contents in strand form and pelletizing with a pelletizer. The obtained pellets were introduced into a tumbler and were subjected to solid-phase polymerization under reduced pressure to yield a polyamide (MXD6I) having an increased molecular weight and an adjusted amount of component with a molecular weight of not more than 1,000. This is referred to as "MXD6I" below.

Production Example 6

Polyamide (MXD6') Synthesis

The previously described MX Nylon S6007 was subjected to solid-phase polymerization in a vacuum tumbler to obtain pellets of a polyamide resin (MXD6') in which the molecular weight had been raised to 34,483. This is referred to as "MXD6'" below.

Production Example 7

Polyamide (PXD10') Synthesis 8950 g (44.25 mol) sebacic acid (Sebacic Acid TA, from Itoh Oil Chemicals Co., Ltd.), 12.54 g (0.074 mol) calcium hypophosphite, 6.45 g (0.079 mol) sodium acetate, 5912 g (43.76 mol) para-xylylenediamine (from Mitsubishi Gas Chemical Co., Ltd.), and 19 kg distilled water were introduced into a 50-L oil jacket-equipped stainless steel reaction kettle fitted with a partial condenser fed with temperature-adjusted oil, a total condenser, a stirrer, a nitrogen inlet tube, and a diamine dripping port, and a thorough nitrogen substitution was performed.

With the apparatus sealed, a salt from the sebacic acid and para-xylylenediamine was produced while stirring the contents and raising the temperature to 200° C. over 1.5 hours. Then, while raising the temperature further and holding the pressure in the reactor once it had reached 1.9 MPa, the charged water and the water produced by the reaction were distilled from the apparatus over 1.5 hours; during this interval, the reaction temperature was raised to 250° C. While continuing to distil out the water, the reaction pressure was then dropped in one hour to normal pressure; the reaction temperature during this interval was raised to 302° C. The polymer was thereafter withdrawn at a resin temperature of 302° C. through the strand die in strand form, cooled in 20° C. cooling water, and pelletized to obtain pellets of a polyamide resin having a number-average molecular weight of 5,362 (PXD10'). This is referred to below as "PXD10'".

Example 1

MXD10 was dried with a vacuum drier and was melt-extruded with a single-screw extruder that had a 30 mmΦ screw and was extrusion molded through a T-die with a width of 500 mm, and a film having texturing in the film surface was molded using twin stainless steel rolls provided with peak-and-valley texturing in the surface. The roll temperature was 70° C. and pressure was applied at a roll pressure of 0.4 MPa. The film edges were slit to obtain a cast film having a thickness of 20 μm and a width of 450 mm. The surface roughness, heat capacity of crystallization, and moisture content were measured on the resulting film using the following methods.

[Methods for Measuring the Properties of the Polyamide Resin (A) Film]

(The Moisture Content)

The moisture content of the polyamide resin (A) film obtained by the above-described method was measured by the Karl Fischer method. An AQ-2000 trace moisture analyzer from Hiranuma Sangyo Corporation was used for the measurement. The measurement temperature was the melting point of the polyamide resin−5° C., and the measurement time was 30 minutes. When the polyamide resin (A) had two or more melting points, the measurement was carried out using the peak top temperature of the endothermic peak at the higher or highest temperature for the melting point. The results are shown in Table 1.

(The Heat Capacity of Crystallization)

Using a differential scanning calorimetry (DSC) measurement method and a "DSC-60" from the Shimadzu Corporation, the polyamide resin was melted by raising the temperature from 30° C. at a rate of 10° C./minute to at least the temperature of the anticipated melting point. The heat capacity of crystallization was determined from the exothermic peak during this process.

(The Surface Roughness (Ra))

This was determined according to the previously described method.

Then, the MXD10 film and a sheet provided by uniformly aligning unidirectionally aligned polyacrylonitrile-based carbon fibers (TORAYCA T300-3000 from Toray Industries, Inc., 3000 filaments, 198 tex, tensile modulus=230 GPa, average fiber diameter=7 μm) in one direction were continuously glued together using a plurality of rolls and applying a pressure of 1 MPa while heating to 220° C. This was followed by cooling with a 40° C. roll and winding up into roll form to obtain the composite material. The rolls used for the application of heat and compression had a fluororesin coated on the roll surface. The heat capacity of crystallization of the polyamide resin (A) in the obtained composite material, the polyamide resin (A)/fibrous material (B) area ratio in the cross section in the obtained composite material, and the void area ratio in the cross section in the obtained composite material were measured using the methods described below.

The results are given in Table 1.

[Methods for Measuring the Properties of the Composite Material]

(the Heat Capacity of Crystallization for the Polyamide Resin (A) in the Composite Article)

Using a differential scanning calorimetry (DSC) measurement method and a DSC-60 from the Shimadzu Corporation, the polyamide resin was melted by raising the temperature from 30° C. at a rate of 10° C./minute to at least the temperature of the anticipated melting point. The heat capacity of crystallization was determined from the exothermic peak during this process.

(The Polyamide Resin (A)/Fibrous Material (B) Area Ratio in the Cross Section and the Void Area Ratio in the Cross Section)

These were determined by observation of the cross section of the composite material with a digital microscope (VHX-1000 from the KEYENCE Corporation).

An assembly was then prepared by stacking, while alternating by 90°, 10 plies of the obtained composite material that had been cut to 20 cm×20 cm; the previously described MXD10 monolayer film was laid on the outermost surfaces of the assembly; and, using a hot press, heating was carried out to 220° C. and hot-press molding was performed at a pressure of 1 MPa using dies whose surfaces were coated with a fluororesin. Cooling then yielded a plate-shaped molding having MXD10 at both surfaces. The obtained molding was submitted to 130° C.×1 hour heat treatment using an oven. The following were measured on the obtained molding using the methods described below: the average fiber length of the fibrous material (B) in the molding, the heat capacity of crystallization, the polyamide resin (A)/fibrous material (B) area ratio in the cross section, the void area ratio in the cross section, the tensile modulus, the tensile modulus after treatment with hot water, and the amount of warping.

[The Methods for Measuring the Properties of the Molding]

(the Average Fiber Length of the Fibrous Material (B) in the Molding)

The molding obtained by the method described above was dissolved in hexafluoroisopropanol (HFIP); the length of the remaining fibers was measured; and the average fiber length (number-average) was calculated.

(Heat Capacity of Crystallization of the Polyamide Resin (A) in the Molding)

This was performed using the same procedure as in the measurement method described above for the composite material.

(The Polyamide Resin (A)/Fibrous Material (B) Area Ratio in the Cross Section and the Void Area Ratio in the Cross Section)

These were performed using the same procedures as in the measurement methods described above for the composite material.

(The Tensile Modulus)

The molding obtained by the above-described method was converted into a 1 cm×10 cm shape and the tensile modulus was measured based on JIS K7113.

(The Amount of Warping)

The molding (20 cm×20 cm) obtained by the above-described method was held for 1 week at 23° C./90% RH and the amount of warping at a point 10 cm from the center was measured. This warping was obtained by subtracting the thickness of the test specimen from the maximum height of the test specimen. This means that a smaller amount of warping indicates a better dimensional stability.

(The Tensile Modulus after Treatment with Hot Water)

The molding obtained by the above-described method was made into a 1 cm×10 cm shape and was immersed for 1 hour in boiling water at 100° C., after which the tensile modulus was measured according to JIS K7113.

Example 2

Polyamide MPXD10, after being dried for 7 hours at 150° C. using a vacuum dryer, was melt-extruded with a single-screw extruder having a 30 mmΦ screw and was extruded in strand form from a 60-orifice die and stretched while being wound up with a roll to obtain a multifilament. The total fineness, monofilament fineness, and tensile strength were measured on the obtained polyamide resin (A) fiber using the following methods.

The results are given in Table 1.

[The Methods for Measuring the Properties of the Polyamide Resin (A) Fiber]

(The Total Fineness)

This was determined by measuring the weight of a freely selected length of the multifilament and converting into the weight per 1,000 m.

(The Monofilament Fineness)

This was determined by dividing the total fineness by the number of filaments in the multifilament.

(The Tensile Strength)

Using a tensile tester, a tensile test was executed on the multifilament at 23° C./50% RH. The maximum stress was divided by the fineness to give the strength per unit fineness.

(The Moisture Content)

This was done by the same procedure as in the measurement method for the previously described polyamide resin (A) film.

Then, while spreading the obtained multifilament, a polyacrylonitrile-based carbon fiber (TR50S-15K, from Mitsubishi Rayon Co., Ltd.) was continuously pasted, while being spread, with the MPXD10 fiber while heating to 250° C. and applying pressure at 0.7 MPa, thereby providing a thickness 20 μm×30 cm×30 cm composite material. The heat capacity of crystallization for the polyamide resin (A) in the obtained composite material, the polyamide resin (A)/fibrous material (B) area ratio in the cross section in the obtained composite material, and the void area ratio in the cross section in the obtained composite material were measured by the same methods as described for Example 1.

The results are shown in Table 1.

An assembly was then prepared by stacking, while alternating each by an angle of 90°, 10 plies of this composite material that had been cut to 20 cm×20 cm. Using a hot press, heating was carried out to 230° C. and hot-press molding was performed at a pressure of 1 MPa using dies whose surfaces were coated with a fluororesin; cooling then yielded a molding. The obtained molding was subjected to a heat treatment for 1 hour at 140° C.

The results of the evaluations are shown in Table 1.

Example 3

Polyamide PXD10, after being dried for 7 hours at 150° C. using a vacuum dryer, was melt-extruded with a single-screw extruder having a 30 mmΦ screw; high-pressure low-density polyethylene (product name: "NOVATEC LF240", from Japan Polyethylene Corp.) was also melt-extruded with a single-screw extruder having a 30 mmΦ screw; and these were co-extruded through a T-die with a width of 500 mm to obtain a polyethylene layer (thickness=30 μm)/PXD10 layer (thickness=25 μm) two-layer cast film having a width of 450 mm.

The obtained two-layer film was slit to a width of 400 mm, and, while peeling at the interface between the polyethylene layer and the PXD10 layer, these were each wound into roll form, thereby yielding a roll of PXD6 film having a length of 500 mm, a thickness of 25 μm, and a width of 400 mm. The surface roughness, heat capacity of crystallization, and moisture content were measured on the obtained film using the following methods.

The obtained film was layered with a carbon fiber woven fabric (PYROFIL Cross TR3110, from Mitsubishi Rayon Co., Ltd.) and this was continuously glued together at a pressure of 0.5 MPa using rolls heated to 300° C. Cooling with a 70° C. roll then yielded a composite material having a thickness of 30 μm.

The results of the evaluation of this composite material are given in Table 1.

An assembly was then prepared by stacking, while alternating each by an angle of 90°, 8 plies of the obtained composite material that had been cut to 20 cm×20 cm; the previously described PXD10 monolayer film was laid on the outermost surfaces of the assembly; and, using a hot press, heating was carried out to 220° C. and hot-press molding was performed at a pressure of 1.5 MPa with heating to 310° C. with a plurality of rolls. This was followed by a heat treatment with a plurality of 110° C. rolls to obtain a molding.

The results of the evaluations are shown in Table 1.

Examples 4 to 8

The polyamide resins were selected as indicated in Tables 1 and 2 below, and the film thickness, surface roughness (Ra), heat capacity of crystallization, and moisture content were changed as indicated in Table 1. Composite materials were fabricated as in Example 1 while changing the composite material production conditions as indicated in the tables. During composite material fabrication, the polyamide resins indicated in the tables were used for the monolayer film used on the outermost surfaces of the assembly. The heat capacity of crystallization of the polyamide resin (A) in the obtained composite material, the polyamide resin (A)/fibrous material (B) area ratio in the cross section in the obtained composite material, and the void area ratio in the cross section in the obtained composite material were measured using the methods indicated in Example 1. The results are given in Tables 1 and 2.

Using the obtained composite materials, moldings were fabricated as in Example 1, but changing the molding fabrication conditions as indicated in Table 1. The average fiber length of the fibrous material (B) in the obtained moldings, the heat capacity of crystallization, the polyamide resin (A)/fibrous material (B) area ratio in the cross section in the obtained moldings, the void area ratio in the cross section in the obtained moldings, the tensile modulus, the amount of warping, and the flexural modulus after treatment with hot water were measured using the methods described in Example 1.

The evaluation results are given in Tables 1 and 2 below.

Example 9

A film having texturing in the film surface was molded as follows: MXD6 was melt-extruded using a single-screw extruder having a 30 mmΦ screw, extrusion molded through a T-die with a width of 500 mm, and pressed, at a roll temperature of 70° C. and a roll pressure of 0.4 MPa, by twin stainless steel rolls having a peak-and-valley texture provided in their surfaces. The films edges were slit to obtain a cast film having a thickness of 20 μm and a width of 450 mm. The obtained film was subjected to a heat treatment for 1 hour at 150° C. The film had a heat capacity of crystallization of 0 J/g.

The obtained film was layered with a sheet provided by unidirectionally aligning pitch-based carbon fibers (DIA-LEAD K63712, from Mitsubishi Plastics, Inc., tensile modulus=640 GPa, fineness=2,000 tex, filament count=12,000); this was continuously glued together by a pressure of 3.0 MPa using rolls heated to 270° C.; and a 30 μm-thick composite material was then obtained by cooling on a 70° C. roll.

An assembly was then prepared by stacking, while alternating each by an angle of 90°, 10 plies of this composite material that had been cut to 20 cm×20 cm; the previously described MXD10 monolayer film was laid on the outermost surfaces of the assembly; heating to 260° C. was performed with rolls; hot-press molding was performed at a pressure of 2.0 MPa; and a heat treatment with 150° C. rolls was then carried out to yield a molding. The results of the evaluations performed on the obtained molding are given in Table 2 below.

Example 10

Using a TEM-37BS twin-screw extruder from Toshiba Machine Co., a pitch-based carbon fiber short fiber (DIA-LEAD K223QG from Mitsubishi Plastics, Inc., average fiber length=6 mm, average fiber diameter=11 μm) and polyamide PXD10, which had been dried with a vacuum dryer, were melt-mixed and kneaded in proportions of 25:75 as the weight ratio at an extrusion temperature of 310° C. and pellets were obtained.

The obtained pellets were melt-extruded with a single-screw extruder that had a 30 mmΦ screw and extrusion molded through a T-die with a width of 500 mm, and a film having texturing in the film surface was molded using twin stainless steel rolls provided with peak-and-valley texturing in the surface. The roll temperature was 70° C. and pressure was applied at a roll pressure of 0.4 MPa. The film edges were slit to obtain a cast film having a thickness of 60 μm and a width of 450 mm.

The obtained film was layered with a sheet provided by unidirectionally aligning pitch-based carbon fibers (DIA-LEAD K63712, from Mitsubishi Plastics, Inc., tensile modulus=640 GPa, fineness=2,000 tex, filament count=12,000); this was continuously glued together at a pressure of 0.5 MPa using rolls heated to 300° C.; and a 30 μm-thick composite material was then obtained by cooling on a 70° C. roll.

The results of the evaluations performed on the resulting composite material are given in Table 2.

An assembly was then prepared by stacking, while alternating each by an angle of 90°, 10 plies of this composite material that had been cut to 20 cm×20 cm; the previously described PXD10 monolayer film was laid on the outermost surfaces of the assembly; heating to 310° C. was performed with rolls; hot-press molding was performed at a pressure of 1.5 MPa; and a heat treatment with 120° C. rolls was then carried out to yield a molding. The results of the evaluations performed on the obtained molding are given in Table 2 below.

Example 11

A film, composite material, and molding were prepared under the same conditions as in Example 1, but in this case without stacking the MXD10 monolayer film on the outermost surfaces of the assembly during molding production as in Example 1. The results of the evaluations are shown in Table 2. The surface had a fairly rougher appearance than in Example 1.

Comparative Example 1

A film, composite material, and molding were prepared under the same conditions as in Example 4 using MXD6' for the polyamide resin. The obtained film, composite material, and molding were also evaluated as in Example 4. The results of these evaluations are given in Table 2.

Comparative Example 2

A film, composite material, and molding were prepared under the same conditions as in Example 3 using PXD10' for the polyamide resin. The obtained film, composite material, and molding were also evaluated as in Example 3. The results of these evaluations are given in Table 2. The moldability during the molding process was poor due a large resin outflow.

Comparative Example 3

93 mass % MXD6 and 7.00 mass % component with a molecular weight of not more than 1,000 were dry blended and a composite material and molding were produced under the same conditions as in Example 4. The results of the evaluations are shown in Table 3. The moldability during the molding process was poor due a large resin outflow.

TABLE 1

|  |  | examples | | | | |
| --- | --- | --- | --- | --- | --- | --- |
|  |  | 1 | 2 | 3 | 4 | 5 |
| type of polyamide resin (A) |  | MXD10 | MPXD10 | PXD10 | MXD6 | MXD6 |
| [COOH] | μeq/g | 62 | 110 | 205 | 60 | 60 |
| [NH$_2$] | μeq/g | 44 | 40 | 17 | 20 | 20 |
| [NH$_2$]/[COOH] | — | 0.71 | 0.36 | 0.08 | 0.33 | 0.33 |
| Mn | — | 18868 | 13333 | 9009 | 25000 | 25000 |
| content of component with a molecular weight of not more than 1,000 | mass % | 0.70 | 0.75 | 1.33 | 0.51 | 0.51 |
| Mw/Mn | — | 1.97 | 2.00 | 2.55 | 1.86 | 1.86 |
| melt viscosity | Pa·s | 1130 | 191 | 87 | 650 | 650 |
| flexural modulus retention rate upon moisture absorption | % | 89 | 93 | 100 | 92 | 92 |
| melting point | °C. | 190 | 215 | 280/290 | 239 | 239 |
| glass-transition temperature | °C. | 60 | 63 | 75 | 85 | 85 |
| cyclic compound content | mass % | 0.1 | 0.12 | 0.5 | 0.7 | 2.0 |
| moisture absorption rate | mass % | 0.36 | 0.42 | 0.49 | 0.54 | 0.54 |
| reaction molar ratio | — | 0.9973 | 0.9894 | 0.9718 | 0.9951 | 0.9951 |
| polyamide resin (A) film | | | | | | |
| thickness | μm | 20 | — | 25 | 40 | 40 |
| surface roughness (Ra) | μm | 0.3 | — | 0.007 | 0.2 | 0.2 |
| heat capacity of crystallization | J/g | 30 | — | 20 | 33 | 33 |
| moisture content | mass % | 0.05 | — | 0.07 | 0.08 | 0.08 |
| polyamide resin (A) fiber | | | | | | |
| total fineness | dtex | — | 450 | — | — | — |
| monofilament fineness | dtex | — | 7.5 | — | — | — |
| tensile strength | gf/d | — | 3 | — | — | — |
| moisture content | mass % | — | 0.14 | — | — | — |
| production conditions for the composite material | | | | | | |
| heating temperature | °C. | 220 | 250 | 300 | 270 | 270 |
| pressure | MPa | 1.0 | 0.7 | 0.5 | 3.0 | 3.0 |
| composite material evaluation | | | | | | |
| heat capacity of crystallization of the polyamide resin (A) in the composite material | J/g | 25 | 18 | 10 | 20 | 20 |
| polyamide resin (A)/fibrous material (B) area ratio in the cross section | — | 40/60 | 50/50 | 45/55 | 60/40 | 60/40 |
| void area ratio in the cross section | % | 0.8 | 0.1 | 0.1 | 0.5 | 0.5 |
| molding production conditions | | | | | | |
| heating temperature | °C. | 220 | 230 | 310 | 260 | 260 |
| pressure | MPa | 1.0 | 1.0 | 1.5 | 2.0 | 2.0 |
| heat treatment conditions for the molding | | | | | | |
| temperature | °C. | 130 | 140 | 110 | 150 | 150 |
| time | hr | 1 | 1 | roll | 1 | 1 |
| molding evaluation | | | | | | |
| average fiber length of the fibrous material (B) in the molding | cm | 20 | 20 | 20 | 20 | 20 |
| average fiber length of short fiber (D) in the molding | cm | — | — | — | — | — |
| heat capasity of crystallization of the polyamide resin (A) in the molding | J/g | 1 | 0 | 0 | 0 | 0 |
| polyamide resin (A)/fibrous material (B) area ratio in the cross section | — | 40/60 | 50/50 | 45/55 | 60/40 | 60/40 |
| void area ratio in the cross section | % | 0.8 | 0.1 | 0 | 0.5 | 0.5 |
| tensile modulus | GPa | 230 | 240 | 231 | 230 | 230 |
| tensile modulus after treatment with hot water | GPa | 218 | 227 | 230 | 218 | 201 |
| amount of warping | mm | 0.1 | 0.1 | 0.1 | 0.4 | 0.6 |

TABLE 2

|  |  | examples | | | | | |
| --- | --- | --- | --- | --- | --- | --- | --- |
|  |  | 6 | 7 | 8 | 9 | 10 | 11 |
| type of polyamide resin (A) |  | MPXD6 | MXD6I | PXD10 | MXD6 | PXD10 | MXD10 |
| [COOH] | μeq/g | 120 | 65 | 205 | 60 | 205 | 62 |
| [NH$_2$] | μeq/g | 26 | 22 | 17 | 20 | 17 | 44 |

TABLE 2-continued

| | | examples | | | | | |
|---|---|---|---|---|---|---|---|
| | | 6 | 7 | 8 | 9 | 10 | 11 |
| type of polyamide resin (A) | | MPXD6 | MXD6I | PXD10 | MXD6 | PXD10 | MXD10 |
| [NH$_2$]/[COOH] | — | — | 0.22 | 0.34 | 0.08 | 0.33 | 0.08 | 0.71 |
| Mn | — | — | 13699 | 22989 | — | 25000 | 9009 | 18868 |
| content of component with a molecular weight of not more than 1,000 | mass % | 2.20 | 0.60 | 1.33 | 0.51 | 1.33 | 0.70 |
| Mw/Mn | — | 2.20 | 1.90 | 2.55 | 1.86 | 2.55 | 1.97 |
| melt viscosity | Pa·s | 300 | 700 | 87 | 650 | 87 | 1130 |
| flexural modulus retention rate upon moisture absorption | % | 95 | 90 | 100 | 92 | 100 | 89 |
| melting point | °C. | 255 | 226 | 280/290 | 239 | 280/290 | 190 |
| glass-transition temperature | °C. | 89 | 95 | 75 | 85 | 75 | 60 |
| cyclic compound content | mass % | 0.8 | 0.6 | 0.5 | 0.7 | 0.5 | 0.1 |
| moisture absorption rate | mass % | 0.55 | 0.56 | 0.49 | 0.54 | 0.49 | 0.36 |
| reaction molar ratio | — | 0.9885 | 0.9947 | 0.9718 | 0.9951 | 0.9718 | 0.9973 |
| polyamide resin (A) film | | | | | | | |
| thickness | μm | 50 | 35 | 60 | 40 | 60 | 20 |
| surface roughness (Ra) | μm | 0.15 | 0.4 | 0.3 | 0.2 | 0.3 | 0.3 |
| heat capacity of crystallization | J/g | 28 | 15 | 20 | 0 | 15 | 30 |
| moisture content | mass % | 0.08 | 0.10 | 0.07 | 0.08 | 0.05 | 0.05 |
| polyamide resin (A) fiber | | | | | | | |
| total fineness | dtex | — | — | — | — | — | — |
| monofilament fineness | dtex | — | — | — | — | — | — |
| tensile strength | gf/d | — | — | — | — | — | — |
| moisture content | mass % | — | — | — | — | — | — |
| production conditions for the composite material | | | | | | | |
| heating temperature | °C. | 290 | 240 | 300 | 270 | 300 | 220 |
| pressure | MPa | 2.0 | 2.0 | 0.5 | 3.0 | 0.5 | 1.0 |
| composite material evaluation | | | | | | | |
| heat capacity of crystallization of the polyamide resin (A) in the composite material | J/g | 25 | 30 | 15 | 7.0 | 16 | 25 |
| polyamide resin (A)/fibrous material (B) area ratio in the cross section | — | 63/35 | 50/50 | 70/30 | 60/40 | 68/32 | 40/60 |
| void area ratio in the cross section | % | 0.2 | 1.0 | 0.1 | 3.0 | 0.3 | 0.8 |
| molding production conditions | | | | | | | |
| heating temperature | °C. | 270 | 240 | 310 | 260 | 310 | 220 |
| pressure | MPa | 0.5 | 1.0 | 1.5 | 2.0 | 1.5 | 1.0 |
| heat treatment conditions for the molding | | | | | | | |
| temperature | °C. | 140 | 160 | 120 | 150 | 120 | 130 |
| time | hr | 1 | 1 | 1 | roll | roll | 1 |
| molding evaluation | | | | | | | |
| average fiber length of the fibrous material (B) in the molding | cm | 20 | 20 | 20 | 20 | 20 | 20 |
| average fiber length of short fiber (D) in the molding | cm | — | — | — | — | 0.3 | — |
| heat capacity of crystallization of the polyamide resin (A) in the molding | J/g | 0 | 2 | 0 | 0 | 0 | 1 |
| polyamide resin (A)/fibrous material (B) area ratio in the cross section | | 65/35 | 50/50 | 70/30 | 60/40 | 68/32 | 40/60 |
| void area ratio in the cross section | % | 0.2 | 0.9 | 0 | 2.5 | 0.2 | 0.8 |
| tensile modulus | GPa | 230 | 230 | 230 | 625 | 626 | 230 |
| tensile modulus after treatment with hot water | GPa | 230 | 206 | 229 | 590 | 600 | 218 |
| amount of warping | mm | 0.3 | 0.3 | 0.1 | 0.5 | 0.1 | 0.1 |

TABLE 3

| | | comparative examples | | |
|---|---|---|---|---|
| | | 1 | 2 | 3 |
| type of polyamide resin (A) | | MXD6' | PXD10' | MXD6 |
| [COOH] | μeq/g | 49 | 250 | 60 |
| [NH$_2$] | μeq/g | 9 | 123 | 20 |
| [NH$_2$]/[COOH] | — | 0.18 | 0.49 | 0.33 |
| Mn | — | 34483 | 5362 | 25000 |
| content of component with a molecular weight of not more than 1,000 | mass % | 0.32 | 4.20 | 7.00 |
| Mw/Mn | — | 1.75 | 3.2 | 1.86 |
| melt viscosity | Pa·s | 1000 | 40 | 650 |

TABLE 3-continued

|  |  | comparative examples | | |
|---|---|---|---|---|
|  |  | 1 | 2 | 3 |
| type of polyamide resin (A) |  | MXD6' | PXD10' | MXD6 |
| flexural modulus retention rate upon moisture absorption | % | 93 | 96 | 92 |
| melting point | ° C. | 239 | 279/289 | 239 |
| glass-transition temperature | ° C. | 85 | 75 | 85 |
| cyclic compound content | mass % | 0.05 | 1.5 | 0.7 |
| moisture absorption rate | mass % | 0.54 | 0.51 | 0.54 |
| reaction molar ratio | — | 0.9951 | 0.9809 | 0.9951 |
| polyamide resin (A) film | | | | |
| thickness | μm | 40 | 25 | 40 |
| surface roughness (Ra) | μm | 0.2 | 0.007 | 0.2 |
| heat capacity of crystallization | J/g | 33 | 20 | 33 |
| moisture content | mass % | 0.08 | 0.07 | 0.08 |
| polyamide resin (A) fiber | | | | |
| total fineness | dtex | — | — | — |
| monofilament fineness | dtex | — | — | — |
| tensile strength | gf/d | — | — | — |
| moisture content | mass % | — | — | — |
| production conditions for the composite material | | | | |
| heating temperature | ° C. | 270 | 300 | 270 |
| pressure | MPa | 3.0 | 0.5 | 3.0 |
| composite material evaluation | | | | |
| heat capacity of crystallization of the polyamide resin (A) in the composite material | J/g | 20 | 10 | 20 |
| polyamide resin (A)/fibrous material (B) area ratio in the cross section | — | 60/40 | 10/90 | 50/50 |
| void area ratio in the cross section | % | 7.0 | 6.0 | 0.5 |
| molding production conditions | | | | |
| heating temperature | ° C. | 260 | 310 | 260 |
| pressure | MPa | 1.0 | 1.0 | 2.0 |
| heat treatment conditions for the molding | | | | |
| temperature | ° C. | 150 | 110 | 150 |
| time | hr | 1 | 1 | 1 |
| molding evaluation | | | | |
| average fiber length of the fibrous material (B) in the molding | cm | 20 | 20 | 20 |
| average fiber length of short fiber (D) in the molding | cm | — | — | — |
| heat capacity of crystallization of the polyamide resin (A) in the molding | J/g | 0 | 0 | 0 |
| polyamide resin (A)/fibrous material (B) area ratio in the cross section | — | 60/40 | 10/90 | 40/60 |
| void area ratio in the cross section | % | 6.5 | 5.8 | 0.5 |
| tensile modulus | GPa | 230 | 230 | 230 |
| tensile modulus after treatment with hot water | GPa | 182 | 169 | 190 |
| amount of warping | mm | 0.7 | 1.0 | 1.2 |

As shown by the preceding examples, the composite material of the present invention, in which the meta-xylylene-type polyamide resin (A) is impregnated into the fibrous material (B), exhibits an excellent elastic modulus, presents little warping, and presents little property deterioration under high temperatures/high humidities and thus is shown to be an excellent composite material.

INDUSTRIAL APPLICABILITY

The composite material of the present invention has an excellent elastic modulus, presents little warping, and undergoes little property deterioration at high temperatures and high humidities and also exhibits better recycle characteristics, a better moldability, and a better productivity than conventional thermosetting resins. Due to its excellent mechanical strength even when thin, this composite material makes it possible to achieve weight reduction at the final product level. The composite material of the present invention can be used for a variety of components and parts, and is particularly preferably used for components and parts for electrical and electronic products and for various automotive components and members, and thus exhibits a high industrial applicability.

The invention claimed is:

1. A polyamide resin composite material, comprising:
    a polyamide comprising a plurality of molecules having a number-average molecular weight (Mn) of 6,000 to 30,000; and
    a fibrous material impregnated with the polyamide,
    wherein the fibrous material has an average fiber length of at least 1 cm,
    each of the molecules comprises a diamine structural unit and a dicarboxylic unit,
    at least 50 mole % of the diamine structural units are derived from xylylenediamine, and
    0.5 to 5 mass % of the molecules have a molecular weight of not more than 1,000.

2. The polyamide resin composite material of claim 1, wherein the molecules comprise a cyclic compound formed by a salt produced from a diamine component having the diamine structural unit and a dicarboxylic acid component having the dicarboxylic unit in an amount of from 0.01 to 1 mass %.

3. The polyamide resin composite material of claim 1, wherein the molecules have a molecular weight distribution (Mw/Mn) of from 1.8 to 3.1.

4. The polyamide resin composite material of claim 1, wherein the polyamide has a melt viscosity of 50 to 1,200 Pa·s, when measured at a temperature of a melting point of the polyamide +30° C., at a shear rate of 122 sec$^{-1}$, and at a moisture content in the polyamide of not more than 0.06 mass %.

5. The polyamide resin composite material of claim 1, wherein the polyamide has a flexural modulus retention rate of at least 85% when the polyamide absorbs moisture.

6. The polyamide resin composite material of claim 1, wherein the polyamide has at least two melting points.

7. The polyamide resin composite material of claim 1, wherein the xylylenediamine is meta-xylylenediamine, para-xylylenediamine, or a mixture thereof.

8. The polyamide resin composite material of claim 1, wherein the fibrous material has a functional group at a surface of the fibrous material, and the functional group is derived from at least one compound selected from the group consisting of an epoxy compound, an acrylic compound, an isocyanate compound, a silane compound, and a titanate compound.

9. The polyamide resin composite material of claim 1, wherein the fibrous material has a functional group at a surface of the fibrous material, and the functional group is derived from a silane coupling agent.

10. The polyamide resin composite material of claim 1, wherein the fibrous material is at least one selected from the group consisting of a glass fiber, a carbon fiber, a plant fiber, an alumina fiber, a boron fiber, a ceramic fiber, a metal fiber, an aramid fiber, a polyoxymethylene fiber, an aromatic polyamide fiber, a polyparaphenylenebenzobisoxazole fiber, and an ultrahigh molecular weight polyethylene fiber.

11. The polyamide resin composite material of claim 1, wherein an area ratio of the polyamide to the fibrous material in a cross section of the polyamide resin composite material is from 20/80 to 80/20.

12. The polyamide resin composite material of claim 1, wherein a void area ratio in a cross section of the polyamide resin composite material is not more than 5%.

13. The polyamide resin composite material of claim 1, further comprising:
short fibers having an average fiber diameter smaller than an average fiber diameter of the fibrous material.

14. A method for producing a molding, comprising:
heating the polyamide resin composite material of claim 1; and then
molding the heated polyamide resin composite material at a temperature of 70 to 150° C. in a die or with a roll.

15. The method of claim 14, further comprising:
forming a polyamide resin layer on a surface of the molding.

16. A molding obtained by molding the polyamide resin composite material of claim 1.

17. The molding of claim 16, wherein an area ratio of the polyamide to the fibrous material in a cross section of the polyamide resin composite material is from 20/80 to 80/20.

18. The molding of claim 16, wherein a void area ratio in a cross section of the molding is not more than 5%.

19. The polyamide resin composite material of claim 1, wherein the fibrous material has an average fiber length of from 1 cm to 500 cm.

20. A method for producing a polyamide resin composite material, comprising:
converting a polyamide into a film or a fiber;
stacking a fibrous material and the polyamide that has been converted into the film or the fiber; and then
applying heat and pressure to the polyamide and the fibrous material, such that the polyamide is impregnated into the fibrous material,
wherein the fibrous material has an average fiber length of at least 1 cm,
the polyamide comprises a plurality of molecules each comprising a diamine structural unit and a dicarboxylic unit,
at least 50 mole % of the diamine structural units are derived from xylylenediamine,
the molecules have a number-average molecular weight (Mn) of 6,000 to 30,000, and
0.5 to 5 mass % of the molecules have a molecular weight of not more than 1,000.

21. The method of claim 20, wherein the applying of heat and pressure to the polyamide and the fibrous material is carried out by applying pressure to the polyamide and the fibrous material with a plurality of rolls in a heated atmosphere.

22. The method of claim 20,
wherein the polyamide that has been converted into the film or the fiber has a heat capacity of crystallization of at least 5 J/g, and
the polyamide in the polyamide resin composite material has a heat capacity of crystallization of at least 5 J/g.

23. The method of claim 20, wherein the polyamide that has been converted into the film or the fiber is a film and has a surface roughness (Ra) of from 0.01 to 1 μm.

24. The method of claim 20, wherein the polyamide that has been converted into the film or the fiber is a multifilament fiber and has a monofilament fineness of from 1 to 30 dtex.

25. The method of claim 20, wherein the polyamide that has been converted into the film or the fiber is a multifilament fiber and has a tensile strength of from 1 to 10 gf/d.

26. The method of claim 20, wherein, in the converting, the polyamide is converted into the film by coextruding the polyamide and a polyolefin resin such that a film comprising a polyamide layer comprising the polyamide and a polyolefin resin layer comprising the polyolefin is formed, and separating the polyolefin resin layer from the polyamide layer to form the film.

27. The method of claim 20, wherein the polyamide that has been converted into the film or the fiber has a moisture content of from 0.01 to 0.15 mass %.

* * * * *